(12) United States Patent
Soriaga et al.

(10) Patent No.: US 11,917,594 B2
(45) Date of Patent: Feb. 27, 2024

(54) FREQUENCY DIVISION DUPLEXING IN UNPAIRED SPECTRUM

(71) Applicant: QUALCOMM Incorporated, San Diego, CA (US)

(72) Inventors: Joseph Binamira Soriaga, San Diego, CA (US); Muhammad Sayed Khairy Abdelghaffar, San Jose, CA (US); Jay Kumar Sundararajan, San Diego, CA (US); Wanshi Chen, San Diego, CA (US); Krishna Kiran Mukkavilli, San Diego, CA (US); Tingfang Ji, San Diego, CA (US); Peter Gaal, San Diego, CA (US); Alexei Yurievitch Gorokhov, San Diego, CA (US); Naga Bhushan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 503 days.

(21) Appl. No.: 16/890,723

(22) Filed: Jun. 2, 2020

(65) Prior Publication Data

US 2020/0382267 A1 Dec. 3, 2020

Related U.S. Application Data

(60) Provisional application No. 62/856,690, filed on Jun. 3, 2019.

(51) Int. Cl.
*H04W 72/0453* (2023.01)
*H04L 5/14* (2006.01)
*H04L 5/00* (2006.01)
*H04L 27/26* (2006.01)

(52) U.S. Cl.
CPC ....... *H04W 72/0453* (2013.01); *H04L 5/0037* (2013.01); *H04L 5/0082* (2013.01); *H04L 5/1469* (2013.01); *H04L 27/2602* (2013.01); *H04L 5/0048* (2013.01)

(58) Field of Classification Search
None
See application file for complete search history.

(56) References Cited

U.S. PATENT DOCUMENTS

| 9,591,498 B1 * | 3/2017 | Pearson ............ H04W 56/0035 |
| 9,609,651 B1 * | 3/2017 | Sung ..................... H04L 47/827 |
| 2004/0141469 A1 | 7/2004 | Jung et al. |

(Continued)

FOREIGN PATENT DOCUMENTS

| WO | WO-2020192923 A1 * | 10/2020 |
| WO | WO-2020233789 A1 * | 11/2020 |

OTHER PUBLICATIONS

International Search Report and Written Opinion—PCT/US2020/035921—ISA/EPO—dated Sep. 2, 2020.

*Primary Examiner* — Saumit Shah
(74) *Attorney, Agent, or Firm* — Harrity & Harrity, LLP

(57) ABSTRACT

Various aspects of the present disclosure generally relate to wireless communication. In some aspects, a user equipment (UE) may receive an indication that the UE is to communicate using a frequency division duplexing (FDD) configuration on an unpaired frequency band that includes at least one uplink frequency region and at least one downlink frequency region in accordance with the FDD configuration. The UE may communicate the FDD configuration. Numerous other aspects are provided.

30 Claims, 19 Drawing Sheets

(56) References Cited

U.S. PATENT DOCUMENTS

| | | | |
|---|---|---|---|
| 2009/0052355 A1 | 2/2009 | Jung et al. | |
| 2013/0279459 A1* | 10/2013 | Lee | H04W 72/21 |
| | | | 370/329 |
| 2013/0322308 A1* | 12/2013 | Yu | H04W 28/18 |
| | | | 370/280 |
| 2014/0341089 A1* | 11/2014 | Ji | H04B 7/2656 |
| | | | 370/278 |
| 2016/0315752 A1 | 10/2016 | Chen et al. | |
| 2018/0019859 A1 | 1/2018 | Cheng et al. | |
| 2018/0091285 A1* | 3/2018 | Hosseini | H04L 5/0053 |
| 2019/0190636 A1* | 6/2019 | Kim | H04W 72/23 |

\* cited by examiner

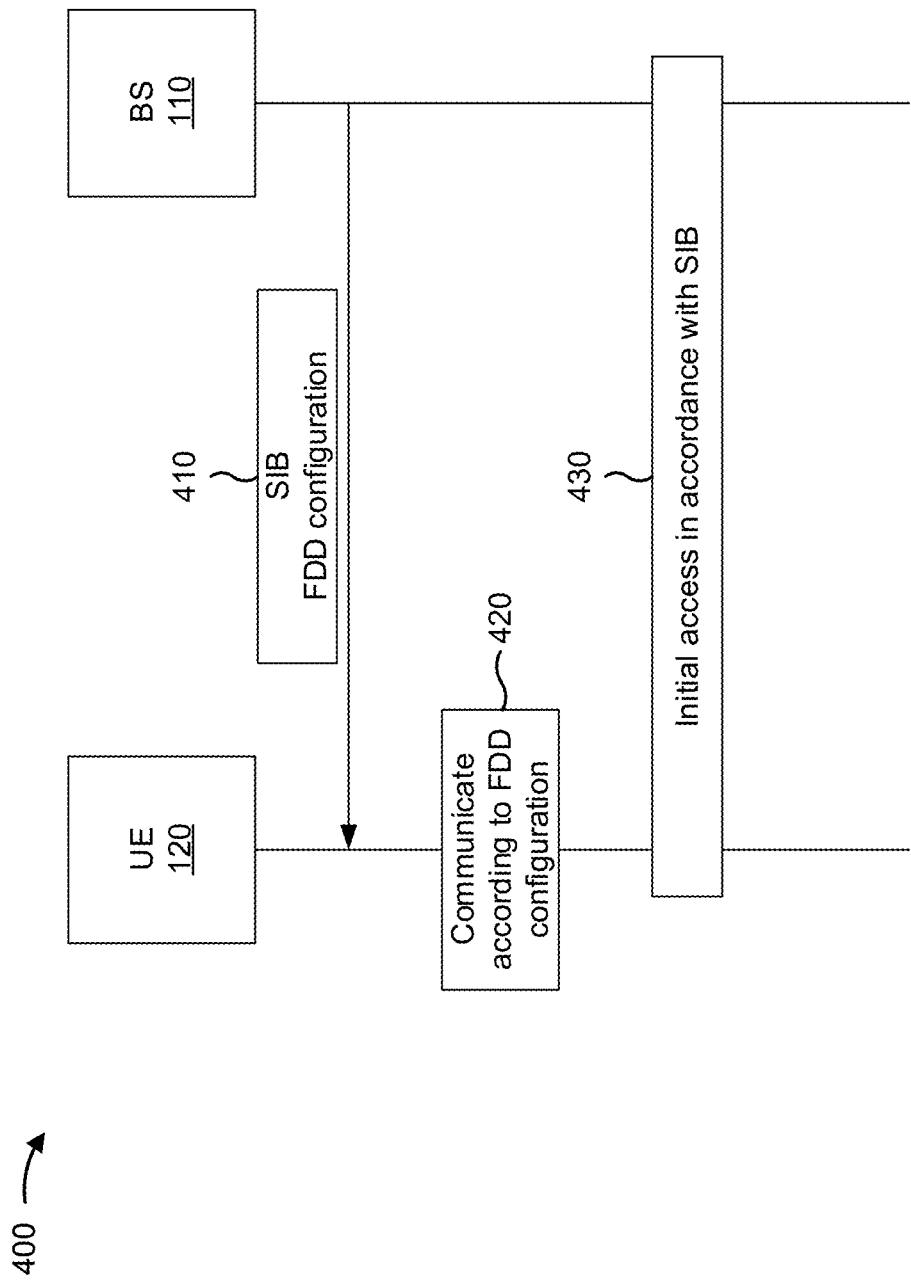

FREQUENCY DIVISION DUPLEXING IN UNPAIRED SPECTRUM

CROSS-REFERENCE TO RELATED APPLICATION

This patent application claims priority U.S. Provisional Patent Application No. 62/856,690, filed on Jun. 3, 2019, entitled "FREQUENCY DIVISION DUPLEXING IN UNPAIRED SPECTRUM," and assigned to the assignee hereof. The disclosure of the prior application is considered part of and is incorporated by reference into this patent application.

FIELD OF THE DISCLOSURE

Aspects of the present disclosure generally relate to wireless communication and to techniques and apparatuses for frequency division duplexing (FDD) in unpaired spectrum.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include receiving an indication that the UE is to communicate using a frequency division duplexing (FDD) configuration on an unpaired frequency band that includes at least one uplink frequency region and at least one downlink frequency region in accordance with the FDD configuration; and communicating using the FDD configuration.

In some aspects, a method of wireless communication, performed by a base station, may include transmitting an indication that a UE is to communicate using an FDD configuration on an unpaired frequency band that includes at least one uplink frequency region and at least one downlink frequency region in accordance with the FDD configuration; and communicating with the UE using the FDD configuration.

In some aspects, a UE for wireless communication may include memory and one or more processors operatively coupled to the memory. The memory and the one or more processors may be configured to receive an indication that the UE is to communicate using an FDD configuration on an unpaired frequency band that includes at least one uplink frequency region and at least one downlink frequency region in accordance with the FDD configuration; and communicate using the FDD configuration.

In some aspects, a base station for wireless communication may include memory and one or more processors operatively coupled to the memory. The memory and the one or more processors may be configured to transmit an indication that a UE is to communicate using an FDD configuration on an unpaired frequency band that includes at least one uplink frequency region and at least one downlink frequency region in accordance with the FDD configuration; and communicate with the UE using the FDD configuration.

In some aspects, a non-transitory computer-readable medium may store one or more instructions for wireless communication. The one or more instructions, when executed by one or more processors of a base station, may cause the one or more processors to: receive an indication that the UE is to communicate using an FDD configuration on an unpaired frequency band that includes at least one uplink frequency region and at least one downlink frequency region in accordance with the FDD configuration; and communicate using the FDD configuration.

In some aspects, a non-transitory computer-readable medium may store one or more instructions for wireless communication. The one or more instructions, when executed by one or more processors of a base station, may cause the one or more processors to: transmit an indication that a UE is to communicate using an FDD configuration on an unpaired frequency band that includes at least one uplink frequency region and at least one downlink frequency region in accordance with the FDD configuration; and communicate with the UE using the FDD configuration.

In some aspects, an apparatus for wireless communication may include means for receiving an indication that the apparatus is to communicate using an FDD configuration on an unpaired frequency band that includes at least one uplink frequency region and at least one downlink frequency region in accordance with the FDD configuration; and means for communicating using the FDD configuration.

In some aspects, an apparatus for wireless communication may include means for transmitting an indication that a UE is to communicate using an FDD configuration on an unpaired frequency band that includes at least one uplink frequency region and at least one downlink frequency region in accordance with the FDD configuration; and means for communicating with the UE using the FDD configuration.

Aspects generally include a method, apparatus, system, computer program product, non-transitory computer-readable medium, user equipment, base station, wireless communication device, and/or processing system as substantially described herein with reference to and as illustrated by the accompanying drawings.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 4 is a diagram illustrating an example of a call flow for implementing an FDD configuration on unpaired spectrum, in accordance with various aspects of the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
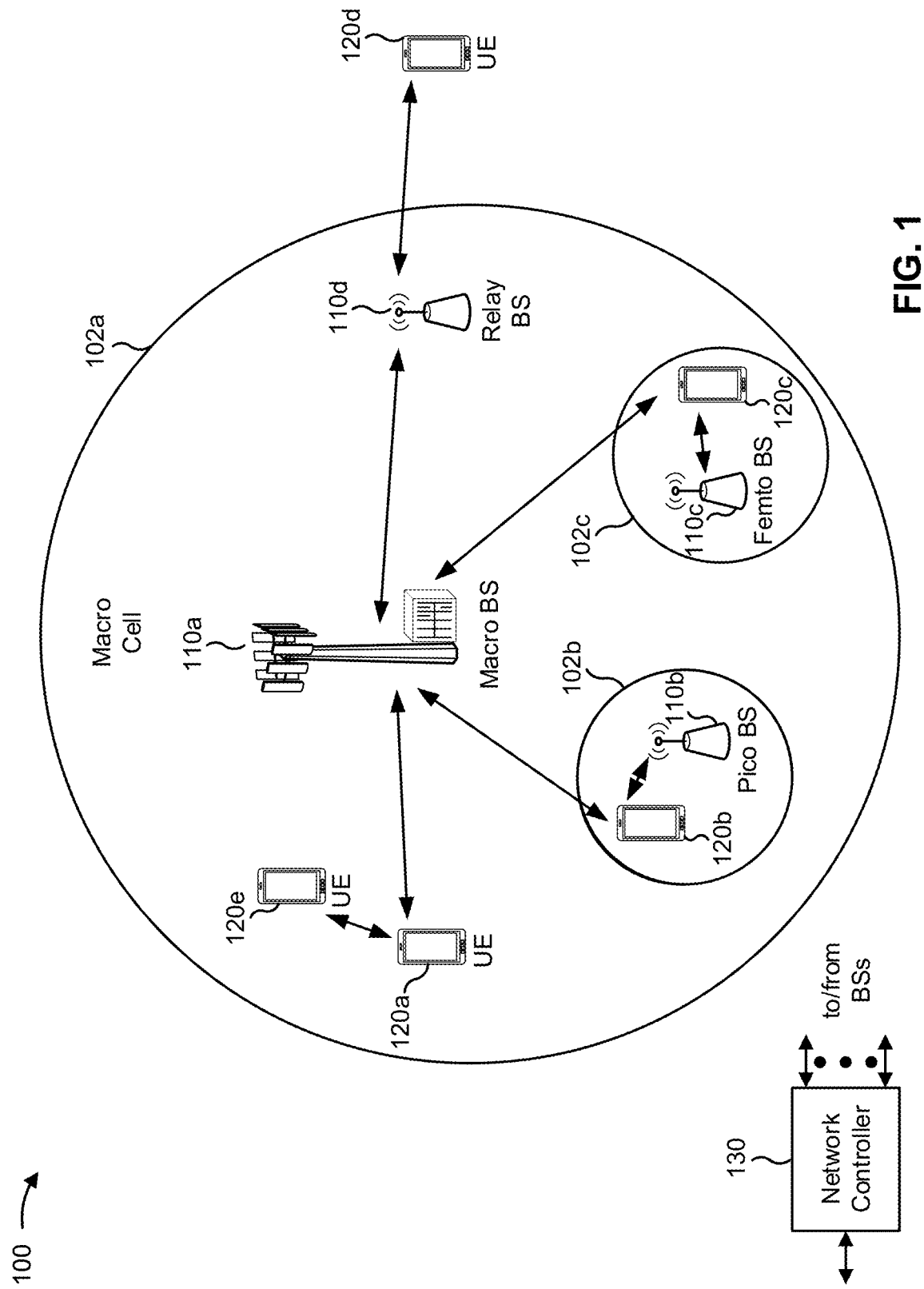
FIG. 1 is a block diagram conceptually illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. ABS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
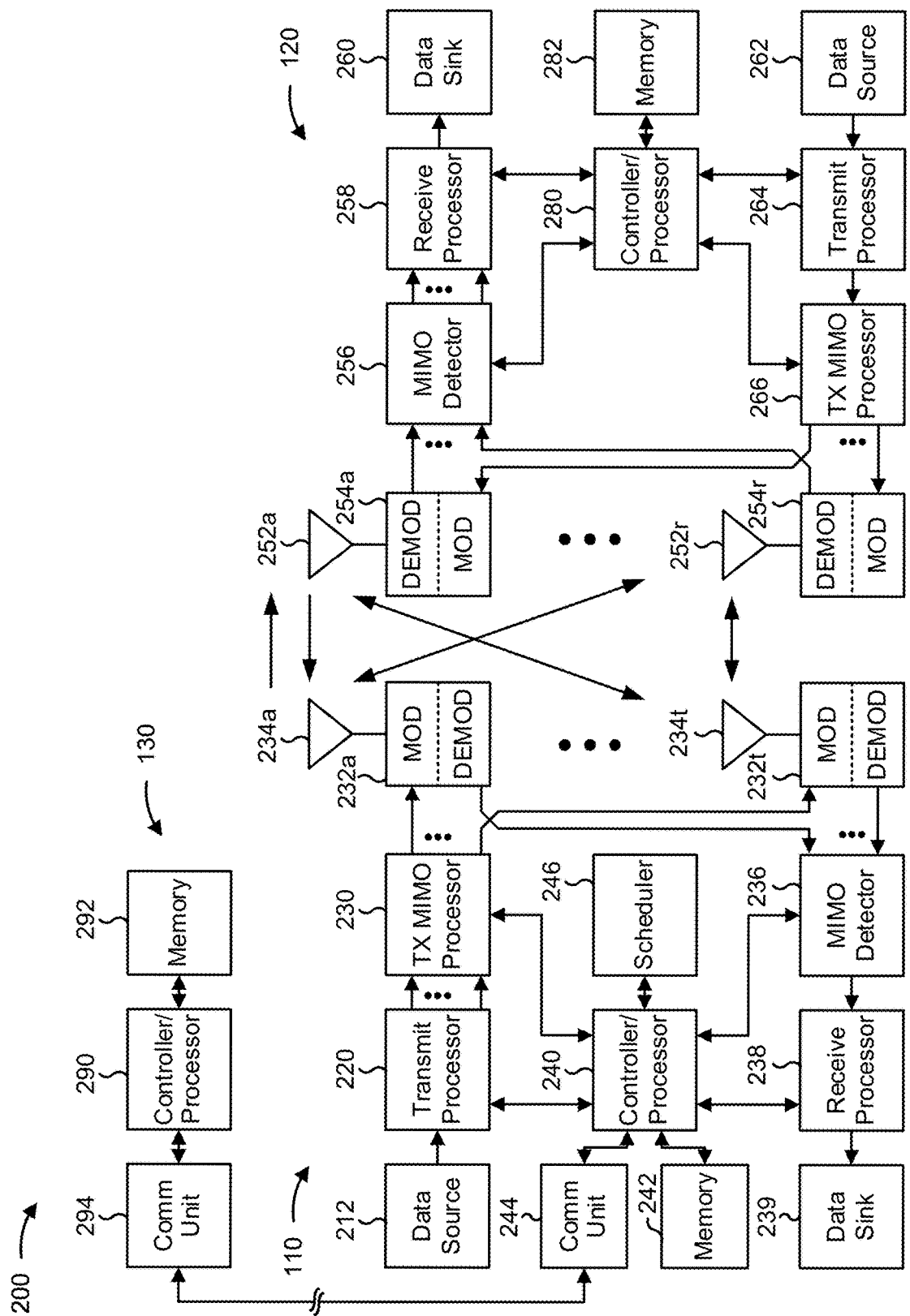
FIG. 2 is a block diagram conceptually illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs)

received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with frequency division duplexing in unpaired spectrum, as described in more detail elsewhere herein. For example, controller/processor 240 of base station 110, controller/processor 280 of UE 120, and/or any other component(s) of FIG. 2 may perform or direct operations of, for example, process 1700 of FIG. 17, process 1800 of FIG. 18, and/or other processes as described herein. Memories 242 and 282 may store data and program codes for base station 110 and UE 120, respectively. A scheduler 246 may schedule UEs for data transmission on the downlink and/or uplink.

In some aspects, UE 120 may include means for receiving an indication that the UE is to communicate using a frequency division duplexing (FDD) configuration on an unpaired frequency band that includes at least one uplink frequency region and at least one downlink frequency region in accordance with the FDD configuration; means for communicating using the FDD configuration; means for communicating in a full duplex mode, wherein the UE transmits on the at least one uplink frequency region while contemporaneously receiving on the at least one downlink frequency region according to the FDD configuration; means for communicating in a half duplex mode using the FDD configuration, where the UE is capable of either receiving on the at least one downlink frequency region or transmitting on the at least one uplink frequency region at a given time; means for performing cross-link interference management in connection with communicating using the FDD configuration; means for receiving an indication that a base station is capable of transmitting in the at least one uplink frequency region while receiving in the at least one downlink frequency region contemporaneously; means for receiving an indication that a base station is not capable of transmitting in the at least one uplink frequency region while receiving in the at least one downlink frequency region contemporaneously; means for receiving dynamic scheduling information that schedules an uplink or downlink communication in accordance with the FDD configuration; and/or the like. In some aspects, such means may include one or more components of UE 120 described in connection with FIG. 2.

In some aspects, base station 110 may include means for transmitting an indication that a user equipment (UE) is to communicate using a frequency division duplexing (FDD) configuration on an unpaired frequency band that includes at least one uplink frequency region and at least one downlink frequency region in accordance with the FDD configuration; means for communicating with the UE using the FDD configuration; means for communicating in a full duplex mode, wherein the base station receives on the at least one uplink frequency region while contemporaneously transmitting on the at least one downlink frequency region according to the FDD configuration; means for communicating in a half duplex mode using the FDD configuration, where the base station is capable of either receiving on the at least one uplink frequency region or transmitting on the at least one downlink frequency region at a given time; means for performing inter-base-station interference management with a second base station based at least in part on respective FDD configurations of the first base station and the second base station; means for transmitting dynamic scheduling information that schedules an uplink or downlink communication in accordance with the FDD configuration; means for transmitting scheduling information that schedules an uplink or downlink communication in accordance with the FDD configuration; and/or the like. In some aspects, such means may include one or more components of base station 110 described in connection with FIG. 2.

As indicated above, FIG. 2 is provided as an example. Other examples may differ from what is described with regard to FIG. 2.

Figure 3A:
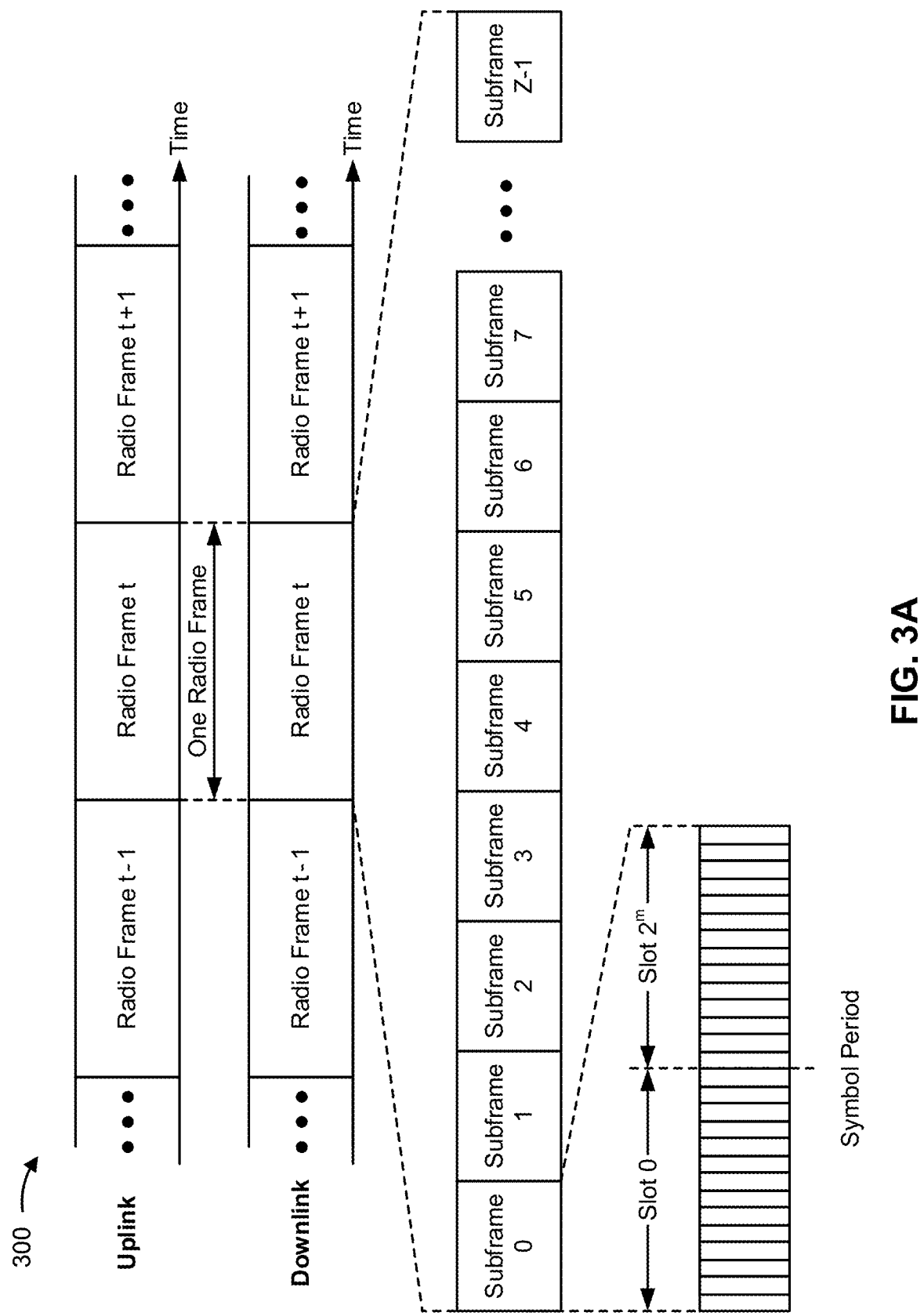
FIG. 3A is a block diagram conceptually illustrating an example of a frame structure in a wireless communication network, in accordance with various aspects of the present disclosure.

FIG. 3A shows an example frame structure 300 for frequency division duplexing (FDD) in a telecommunications system (e.g., NR). The transmission timeline for each of the downlink and uplink may be partitioned into units of radio frames (sometimes referred to as frames). Each radio frame may have a predetermined duration (e.g., 10 milliseconds (ms)) and may be partitioned into a set of Z (Z>1) subframes (e.g., with indices of 0 through Z−1). Each subframe may have a predetermined duration (e.g., 1 ms) and may include a set of slots (e.g., 2' slots per subframe are shown in FIG. 3A, where m is a numerology used for a transmission, such as 0, 1, 2, 3, 4, and/or the like). Each slot may include a set of L symbol periods. For example, each slot may include fourteen symbol periods (e.g., as shown in FIG. 3A), seven symbol periods, or another number of symbol periods. In a case where the subframe includes two slots (e.g., when m=1), the subframe may include 2L symbol periods, where the 2L symbol periods in each subframe may be assigned indices of 0 through 2L−1. In some aspects, a scheduling unit for the FDD may be frame-based, subframe-based, slot-based, symbol-based, and/or the like.

While some techniques are described herein in connection with frames, subframes, slots, and/or the like, these techniques may equally apply to other types of wireless communication structures, which may be referred to using terms other than "frame," "subframe," "slot," and/or the like in 5G NR. In some aspects, a wireless communication structure may refer to a periodic time-bounded communication unit defined by a wireless communication standard and/or protocol. Additionally, or alternatively, different configurations of wireless communication structures than those shown in FIG. 3A may be used.

In certain telecommunications (e.g., NR), a base station may transmit synchronization signals. For example, a base station may transmit a primary synchronization signal (PSS), a secondary synchronization signal (SSS), and/or the like, on the downlink for each cell supported by the base station. The PSS and SSS may be used by UEs for cell search and acquisition. For example, the PSS may be used by UEs to determine symbol timing, and the SSS may be used by UEs to determine a physical cell identifier, associated with the base station, and frame timing. The base station may also transmit a physical broadcast channel (PBCH). The PBCH may carry some system information, such as system information that supports initial access by UEs.

In some aspects, the base station may transmit the PSS, the SSS, and/or the PBCH in accordance with a synchronization communication hierarchy (e.g., a synchronization signal (SS) hierarchy) including multiple synchronization communications (e.g., SS blocks), as described below in connection with FIG. 3B.

Figure 3B:
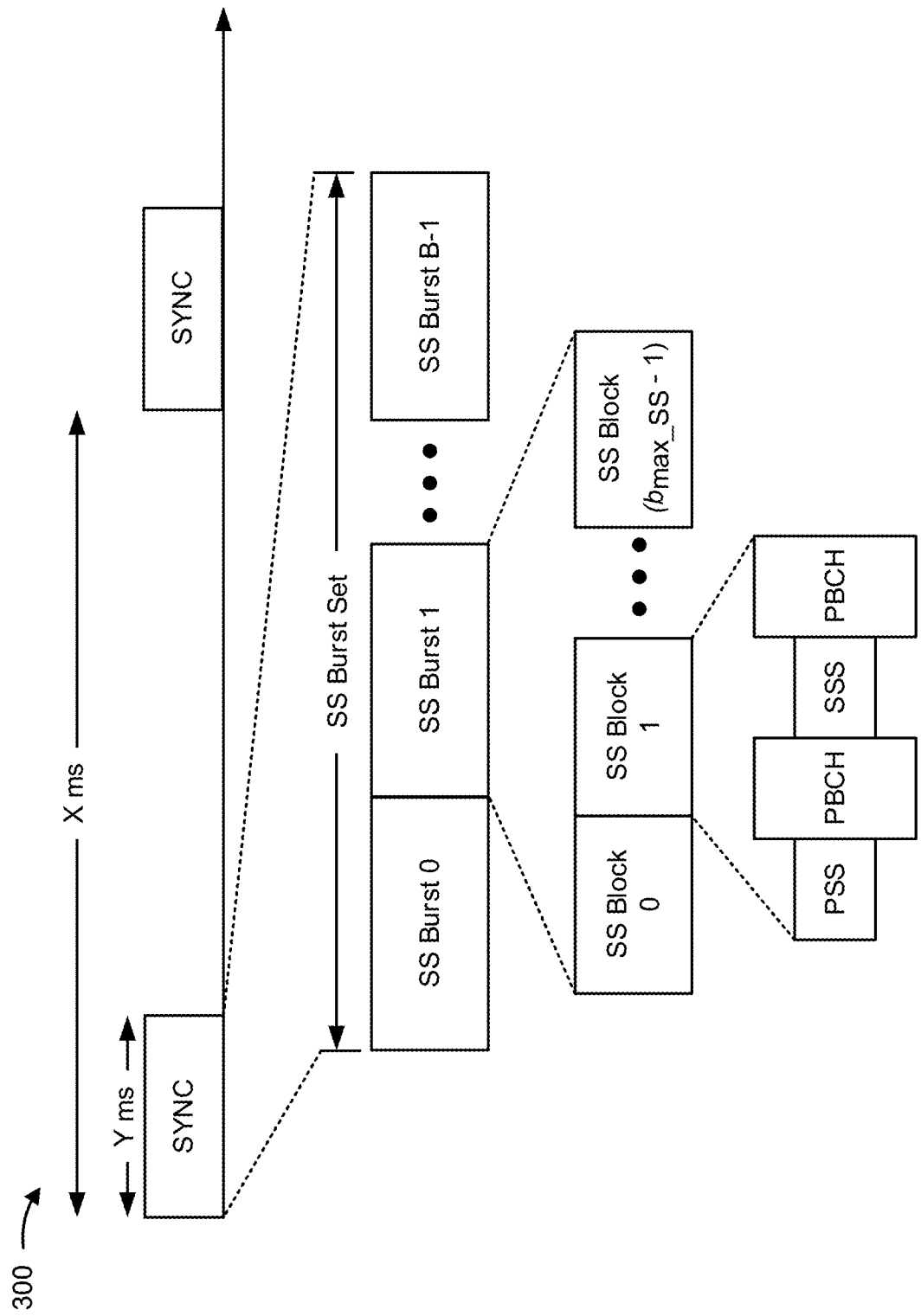
FIG. 3B is a block diagram conceptually illustrating an example synchronization communication hierarchy in a wireless communication network, in accordance with various aspects of the present disclosure.

FIG. 3B is a block diagram conceptually illustrating an example SS hierarchy, which is an example of a synchronization communication hierarchy. As shown in FIG. 3B, the SS hierarchy may include an SS burst set, which may include a plurality of SS bursts (identified as SS burst 0 through SS burst B−1, where B is a maximum number of repetitions of the SS burst that may be transmitted by the base station). As further shown, each SS burst may include one or more SS blocks (identified as SS block 0 through SS block ($b_{max\_SS-1}$), where $b_{max\_SS-1}$ is a maximum number of SS blocks that can be carried by an SS burst). In some aspects, different SS blocks may be beam-formed differently. An SS burst set may be periodically transmitted by a wireless node, such as every X milliseconds, as shown in FIG. 3B. In some aspects, an SS burst set may have a fixed or dynamic length, shown as Y milliseconds in FIG. 3B.

The SS burst set shown in FIG. 3B is an example of a synchronization communication set, and other synchronization communication sets may be used in connection with the techniques described herein. Furthermore, the SS block shown in FIG. 3B is an example of a synchronization communication, and other synchronization communications may be used in connection with the techniques described herein.

In some aspects, an SS block includes resources that carry the PSS, the SSS, the PBCH, and/or other synchronization signals (e.g., a tertiary synchronization signal (TSS)) and/or synchronization channels. In some aspects, multiple SS blocks are included in an SS burst, and the PSS, the SSS, and/or the PBCH may be the same across each SS block of the SS burst. In some aspects, a single SS block may be included in an SS burst. In some aspects, the SS block may be at least four symbol periods in length, where each symbol carries one or more of the PSS (e.g., occupying one symbol), the SSS (e.g., occupying one symbol), and/or the PBCH (e.g., occupying two symbols).

In some aspects, the symbols of an SS block are consecutive, as shown in FIG. 3B. In some aspects, the symbols of an SS block are non-consecutive. Similarly, in some aspects, one or more SS blocks of the SS burst may be transmitted in consecutive radio resources (e.g., consecutive symbol periods) during one or more slots. Additionally, or alternatively, one or more SS blocks of the SS burst may be transmitted in non-consecutive radio resources.

In some aspects, the SS bursts may have a burst period, whereby the SS blocks of the SS burst are transmitted by the base station according to the burst period. In other words, the SS blocks may be repeated during each SS burst. In some aspects, the SS burst set may have a burst set periodicity, whereby the SS bursts of the SS burst set are transmitted by the base station according to the fixed burst set periodicity. In other words, the SS bursts may be repeated during each SS burst set.

The base station may transmit system information, such as system information blocks (SIBs) on a physical downlink shared channel (PDSCH) in certain slots. The base station may transmit control information/data on a physical downlink control channel (PDCCH) in C symbol periods of a slot, where B may be configurable for each slot. The base station may transmit traffic data and/or other data on the PDSCH in the remaining symbol periods of each slot.

As indicated above, FIGS. 3A and 3B are provided as examples. Other examples may differ from what is described with regard to FIGS. 3A and 3B.

A wireless communication standard or governing body may specify how a wireless spectrum is to be used. For example, 3GPP may specify how wireless spectrum is to be used for the 5G/NR radio access technology and interface. As an example, a specification may indicate whether a band is to be used as paired spectrum or unpaired spectrum. A band in a paired spectrum may use a first frequency region for uplink communication and a second frequency region for downlink communication, wherein the first frequency region does not overlap the second frequency region. For example, a paired band may have an uplink operating band and a downlink operating band that are configured to use non-overlapped frequency regions. Examples of paired bands in NR include NR operating bands n1, n2, n3, n5, n7, n8, n12, n20, n25, and n28, as specified by 3GPP Technical Specification (TS) 38.101-1. An unpaired band may allow downlink and uplink operation within a same frequency region (e.g., a same sub-band or component). For example, an unpaired band may configure an uplink sub-band and a downlink sub-band in the same frequency range. Some deployments may use time division duplexing (TDD) in the unpaired band, wherein some time intervals (e.g., slots, symbols, and/or the like) are used for uplink communications and other time intervals are used for downlink communications. In this case, substantially the entire bandwidth of a component carrier may be used for a downlink communication or an uplink communication, depending on whether the communication is performed in a downlink slot, an uplink slot, or a special slot (in which downlink or uplink communications can be scheduled). Examples of unpaired bands include NR operating bands n40, n41, and n50, as specified by 3GPP TS 38.101-1.

In some cases, it may be inefficient to use TDD in unpaired spectrum. For example, uplink transmit power may be limited, meaning that UEs may not be capable of transmitting with enough power to efficiently utilize the full bandwidth of an uplink slot. This may be particularly problematic in large cells at the cell edge. Furthermore, the usage of TDD may introduce latency relative to a scheme in which uplink communications and downlink communications can be performed in the same time interval, since a given time interval may be used only for uplink communication or for downlink communication.

Some techniques and apparatuses described herein provide communication in an unpaired band using FDD. For example, some techniques and apparatuses described herein may use a single component carrier on which at least one uplink frequency region and at least one downlink frequency region are configured or scheduled. As another example, some techniques and apparatuses described herein may use respective component carriers for uplink and downlink communication in an unpaired band. Furthermore, techniques for interference management, cross-operator scheduling, and fixed and variable FDD configurations are provided. In this way, techniques and apparatuses described herein enable sub-band full duplex using FDD in unpaired spectrum. Thus, spectral efficiency in unpaired bands may be improved, particularly in large cells and at the cell edge. Furthermore, latency may be reduced on unpaired bands relative to a TDD configuration.

FIG. 4 is a diagram illustrating an example 400 of a call flow for implementing an FDD configuration in unpaired spectrum, in accordance with various aspects of the present disclosure. As shown, example 400 includes a UE 120 and a BS 110. In example 400, the UE 120 is configured using a system information block (SIB) that includes the FDD configuration. In some aspects, this may involve modification of a specification that prescribes SIB formats and content (such as a 3GPP TS and/or the like). For an example of configuration of an FDD configuration that may not involve modification of a specification, refer to example 500 of FIG. 5.

As shown in FIG. 4, and by reference number 410, the BS 110 may transmit, to UEs 120 covered by the BS 110, a SIB. As further shown, the SIB may identify the FDD configuration. For example, the SIB may include an indication that the UE 120 is to use the FDD configuration and/or may explicitly identify the FDD configuration. The FDD configuration may identify at least one uplink frequency region and at least one downlink frequency region for an unpaired frequency band. For example, the FDD configuration may identify locations of the at least one uplink frequency region and the at least one downlink frequency region. Particular examples of FDD configurations are provided in connection with FIGS. 6-16, below.

As shown by reference number 420, the UE 120 may communicate according to the FDD configuration. For example, if the UE 120 supports an FDD configuration on the unpaired frequency band using the SIB, then the UE 120 may communicate according to the FDD configuration. If the UE 120 does not support the FDD configuration on the unpaired frequency band using the SIB (which may be referred to herein as a legacy UE), then the UE 120 may ignore the SIB, may use a different configuration (e.g., a TDD configuration), or may perform another action. In some aspects, the operations described in connection with example 500, below, may be used to configure a legacy UE 120.

As shown by reference number 430, the UE 120 may perform initial access in accordance with the SIB. For example, the UE 120 may access a cell provided by the BS 110 in accordance with the SIB. In some aspects, the UE 120 may communicate with the BS 110 using the FDD configuration specified by the SIB. In some aspects, the SIB may indicate that the cell uses an FDD configuration, and the UE 120 may subsequently receive the FDD configuration from the BS 110.

As indicated above, FIG. 4 is provided as an example. Other examples may differ from what is described with respect to FIG. 4.

Figure 5:
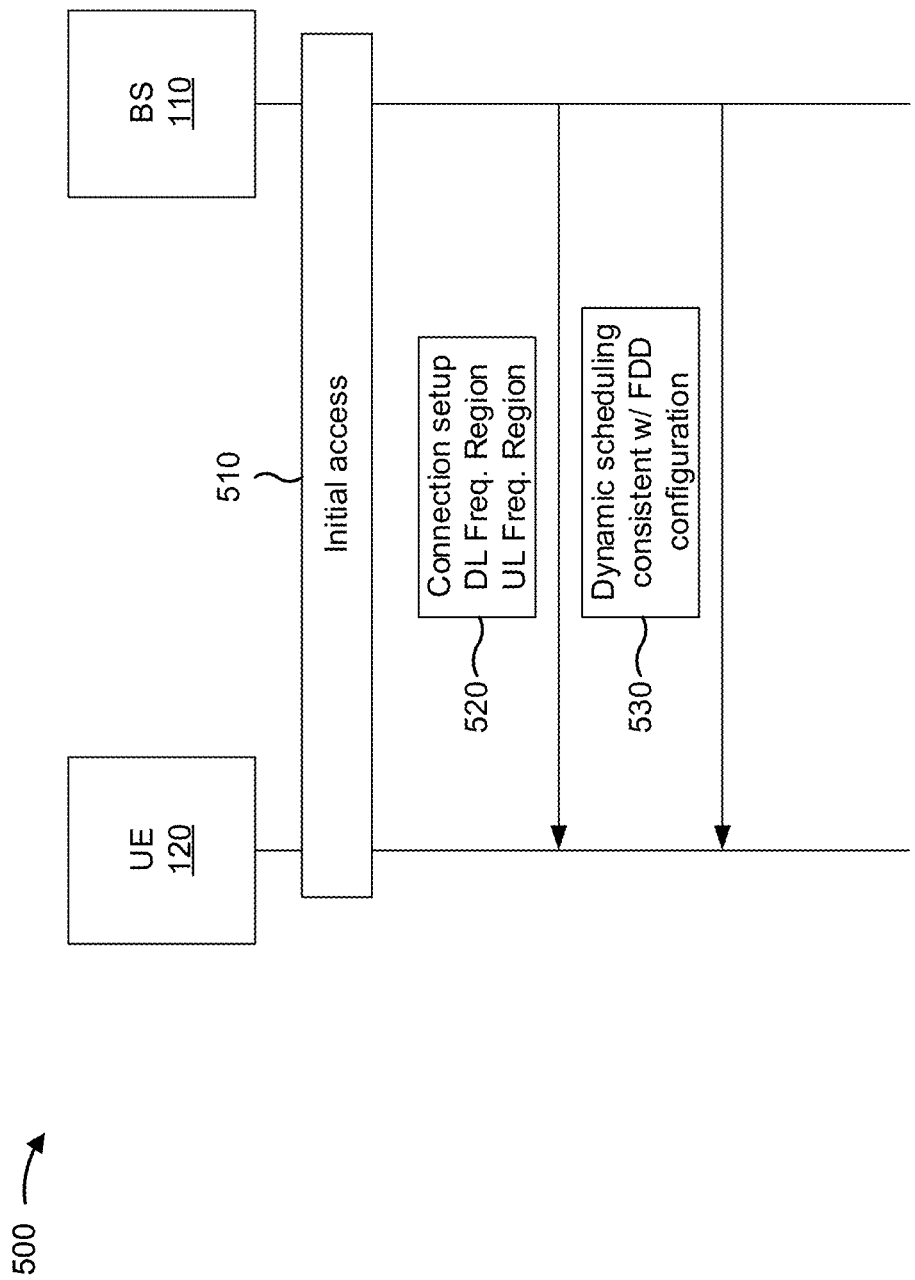
FIG. 5 is a diagram illustrating an example of another call flow for implementing an FDD configuration on unpaired spectrum, in accordance with various aspects of the present disclosure.

FIG. 5 is a diagram illustrating an example 500 of another call flow for implementing an FDD configuration on unpaired spectrum, in accordance with various aspects of the present disclosure. As shown, example 500 includes a BS 110 and a UE 120. In example 500, an FDD configuration is implemented using dynamic scheduling. For example, downlink and uplink communications are scheduled in accordance with the FDD configuration, meaning that FDD configurations can be implemented irrespective of whether the FDD configuration is in a specification.

As shown by reference number 510, the UE 120 and the BS 110 may perform an initial access procedure, such as a random access procedure and/or the like. As shown by reference number 520, the BS 110 may set up a connection with the UE 120. In some aspects, as shown, the BS 110 may provide an indication that the UE 120 is to use an FDD configuration. In some aspects, this indication may identify one or more downlink frequency regions and one or more uplink frequency regions. For example, the indication may explicitly identify the frequency regions. In some aspects, the indication may indicate that one or more downlink frequency regions and one or more uplink frequency regions will be used. For example, the indication may indicate that the UE 120 is to communicate according to an FDD configuration on an unpaired frequency band.

As shown by reference number 530, the BS 110 may perform dynamic scheduling for communications with the UE 120. For example, and as shown, the BS 110 may schedule the communications according to the FDD configuration. In some aspects, the BS 110 may schedule downlink communications to the UE 120 in the one or more downlink frequency regions of the FDD configuration, and may schedule uplink communications from the UE 120 in the one or more uplink frequency regions of the FDD configuration. By dynamically scheduling in accordance with the FDD configuration, the BS 110 may conserve resources that would otherwise be used to configure the UE 120 to use the FDD configuration (e.g., using a SIB and/or the like, as described in connection with FIG. 4) and may improve versatility of TDD communication in the unpaired spectrum.

As indicated above, FIG. 5 is provided as an example. Other examples may differ from what is described with respect to FIG. 5.

FIGS. 6-16 are diagrams illustrating examples of FDD configurations on unpaired spectrum, in accordance with various aspects of the present disclosure. FIGS. 6-16 show examples of time intervals (e.g., slots, slot groups, sub-frames, sub-slots, mini-slots, symbols, and/or the like). A time interval may include an uplink frequency region, a downlink frequency region, or both an uplink frequency region and a downlink frequency region. Each time interval may be associated with a control region, which is illustrated as a darker-shaded portion of the time interval, and a data region, which is shown as DL Data for the downlink frequency region or physical uplink shared channel (PUSCH) for the uplink frequency region. Uplink frequency regions are illustrated using a tighter dotted fill than downlink frequency regions.

An FDD configuration may indicate one or more downlink frequency regions and one or more uplink frequency regions. For example, an FDD configuration may divide an unpaired band (e.g., one or more component carriers of an unpaired band) into uplink frequency regions, downlink frequency regions, and/or other regions (e.g., guard bands in between frequency regions, guard times, and/or the like). In some aspects, the FDD configuration may identify a guard time. A guard time may separate an uplink frequency region from a downlink frequency region in the time domain. The guard time may provide time for a UE 120 and/or a BS 110 to switch between uplink operation and downlink operation or to switch between a frequency associated with the downlink frequency region and a frequency associated with the uplink frequency region. In some aspects, the FDD configuration may identify bandwidth part (BWP) configurations corresponding to the uplink frequency regions and downlink frequency regions. For example, a respective BWP may be configured for each uplink frequency region and each downlink frequency region.

An uplink frequency region and a downlink frequency region may or may not be equal in bandwidth. For example, in the example 600 shown in FIG. 6, the two downlink frequency regions, shown by reference numbers 610 and 620, occupy a smaller bandwidth than the uplink frequency region shown by reference number 630. In this case, the uplink frequency region is provided between the downlink frequency regions, which may reduce interference from downlinks of other BSs 110 associated with frequencies adjacent to the component carrier of example 600. In some aspects, the locations of the uplink frequency regions and the downlink frequency regions may be based at least in part on interference alignment between base stations and operators, as described in more detail elsewhere herein.

The usage of FDD configurations for unpaired spectrum communication may increase throughput and improve spectral efficiency. For example, consider, as a baseline, a TDD configuration of down-down-special-up. This may be associated with, for example, a downlink cell edge rate of 22.5 Mbps and an uplink cell edge rate of 37.5 kbps (e.g., with a 2.5 Mbps median user rate, that is 20 dB less the maximum coupling loss (MCL)). In this case, FDD in the unpaired spectrum with an 80 MHz downlink and a 20 MHz uplink may reduce downlink cell edge spectral efficiency (SE) by 0.8, assuming power spectral density (PSD) is not increased to utilize baseline power. In such a case, 24~30 Mbps may be achievable with a full duty cycle. The uplink UE SE may have no change at the cell edge and at the median. In this case, 250 kbps may be achieved at the cell edge, and 10 Mbps may be achieved at the median. Performance may be further improved for a full-duplex UE. In this case, assuming the same parameters as the previous example, a downlink throughput of 30 Mbps and an uplink throughput of 250 kbps may be concurrently achieved.

Figure 7:
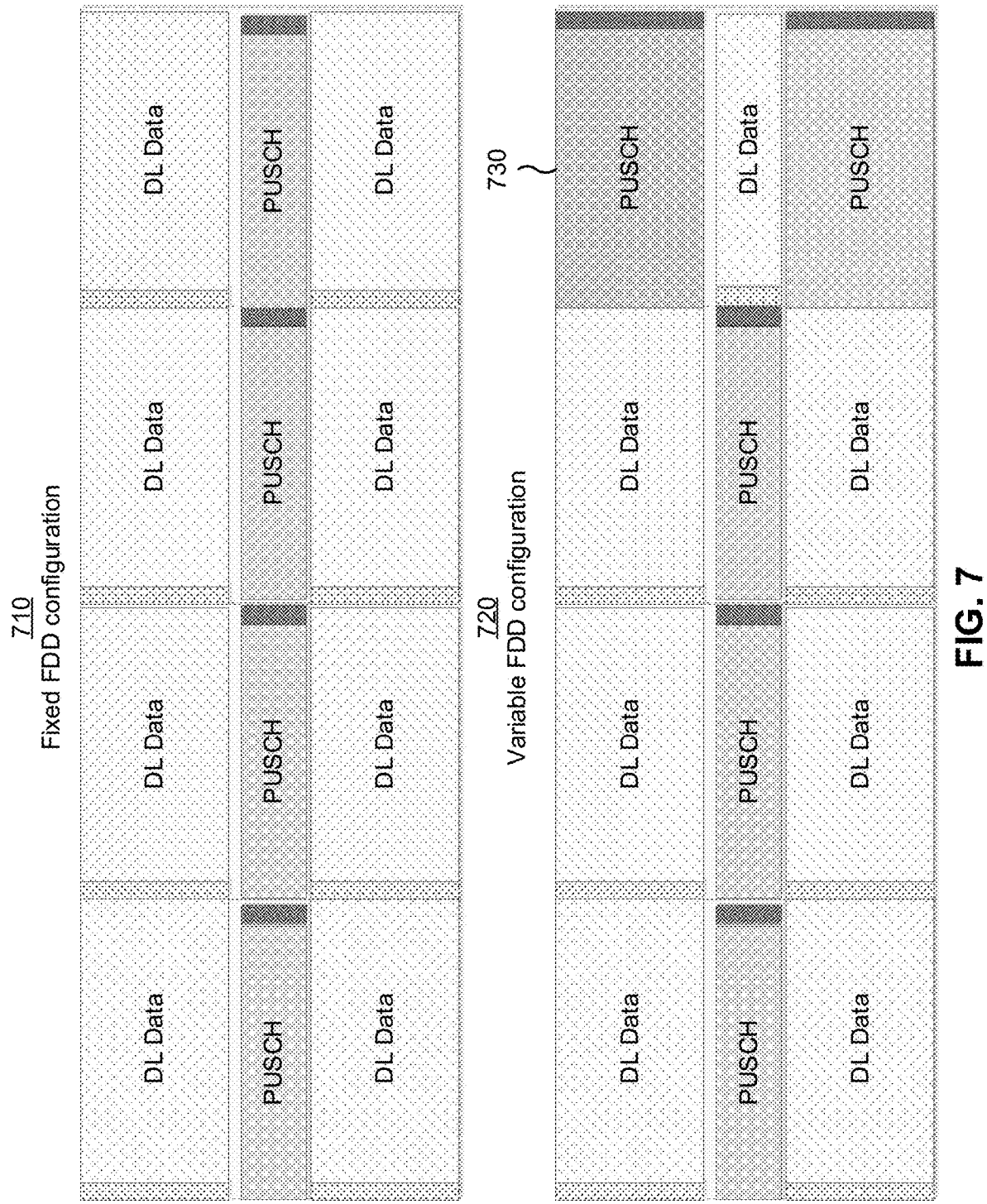

FIG. 7 illustrates examples 710 and 720 of a fixed FDD configuration and a variable FDD configuration, respectively. As shown, the fixed FDD configuration shown by reference number 710 uses the same FDD configuration for each time interval. As shown by reference number 730, the variable FDD configuration shown by reference number 720 uses a different FDD configuration for a fourth time interval than for a first three time intervals. The fixed FDD configuration may be more efficient with regard to signaling, whereas the variable FDD configuration may provide increased flexibility for scheduling. For example, the variable FDD configuration may be used to schedule an uplink-focused time interval, thereby increasing throughput in the uplink-focused time interval while maintaining the low latency associated with the FDD configuration in the other time intervals.

The various FDD configurations described herein may be associated with certain advantages. For example, a less complex FDD configuration may be associated with a lower base station complexity than a more complex FDD configuration. As another example, a particular FDD configuration may be used to provide synchronization between operators and/or between base stations. As yet another example, a particular FDD configuration may be used to provide channel reciprocity between base stations. As still another example, an FDD configuration with an uplink frequency region and a downlink frequency region in each time interval may provide support for low-latency control and data. As another example, a particular FDD configuration may provide a higher uplink or downlink peak rate at the cost of coverage, or vice versa.

As just one example, the variable FDD configuration shown by reference number 720 may require base station synchronization (for the wideband uplink slot shown by reference number 730), may allow low-latency control and data for lower throughputs, may support two-step channel reciprocity, may support base station cancellation, and may have a lower downlink peak rate than some TDD configurations. A network controller or base station may balance these concerns when determining an FDD configuration.

Figure 6:
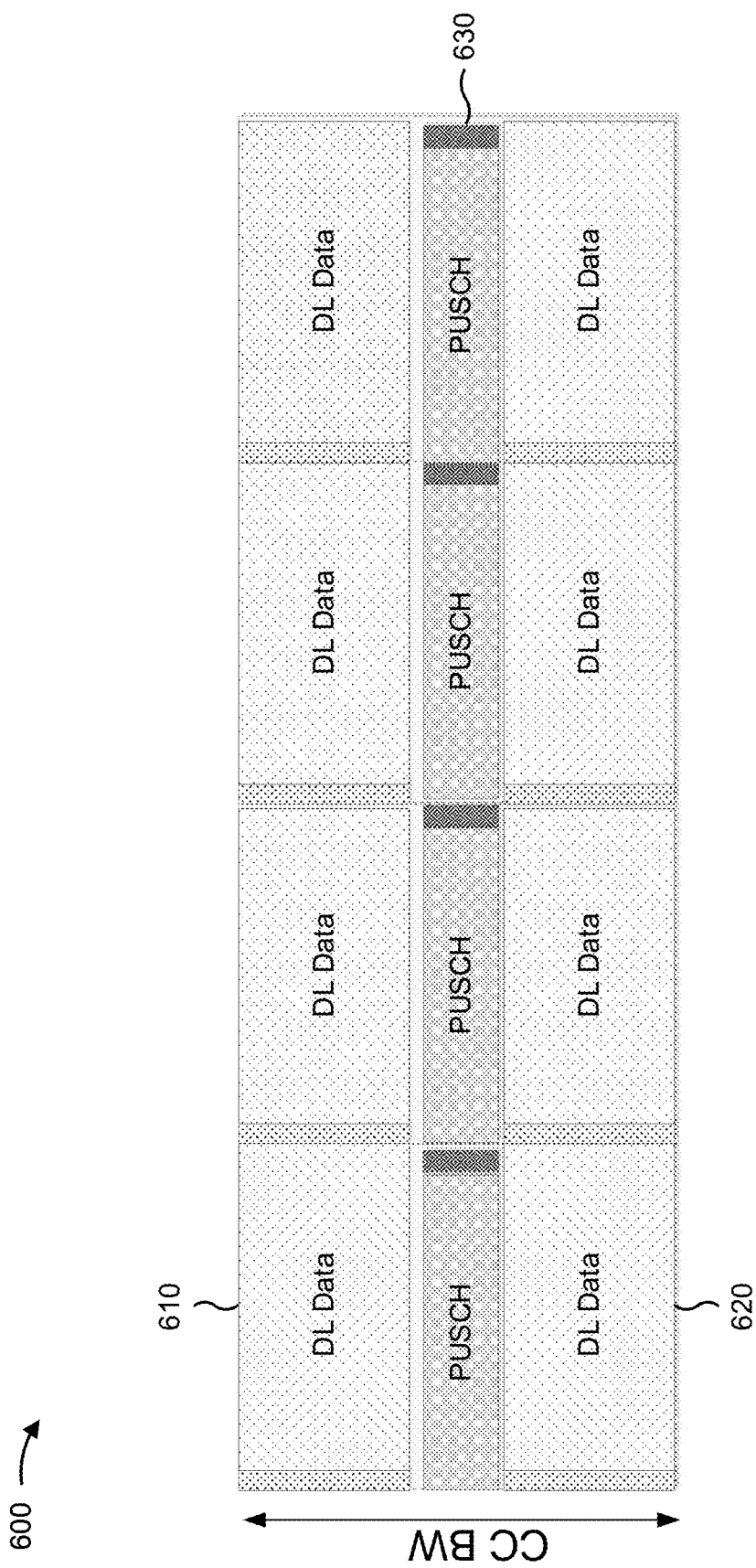
FIGS. 6-16 are diagrams illustrating examples of FDD configurations on unpaired spectrum, in accordance with various aspects of the present disclosure.
Figure 8:
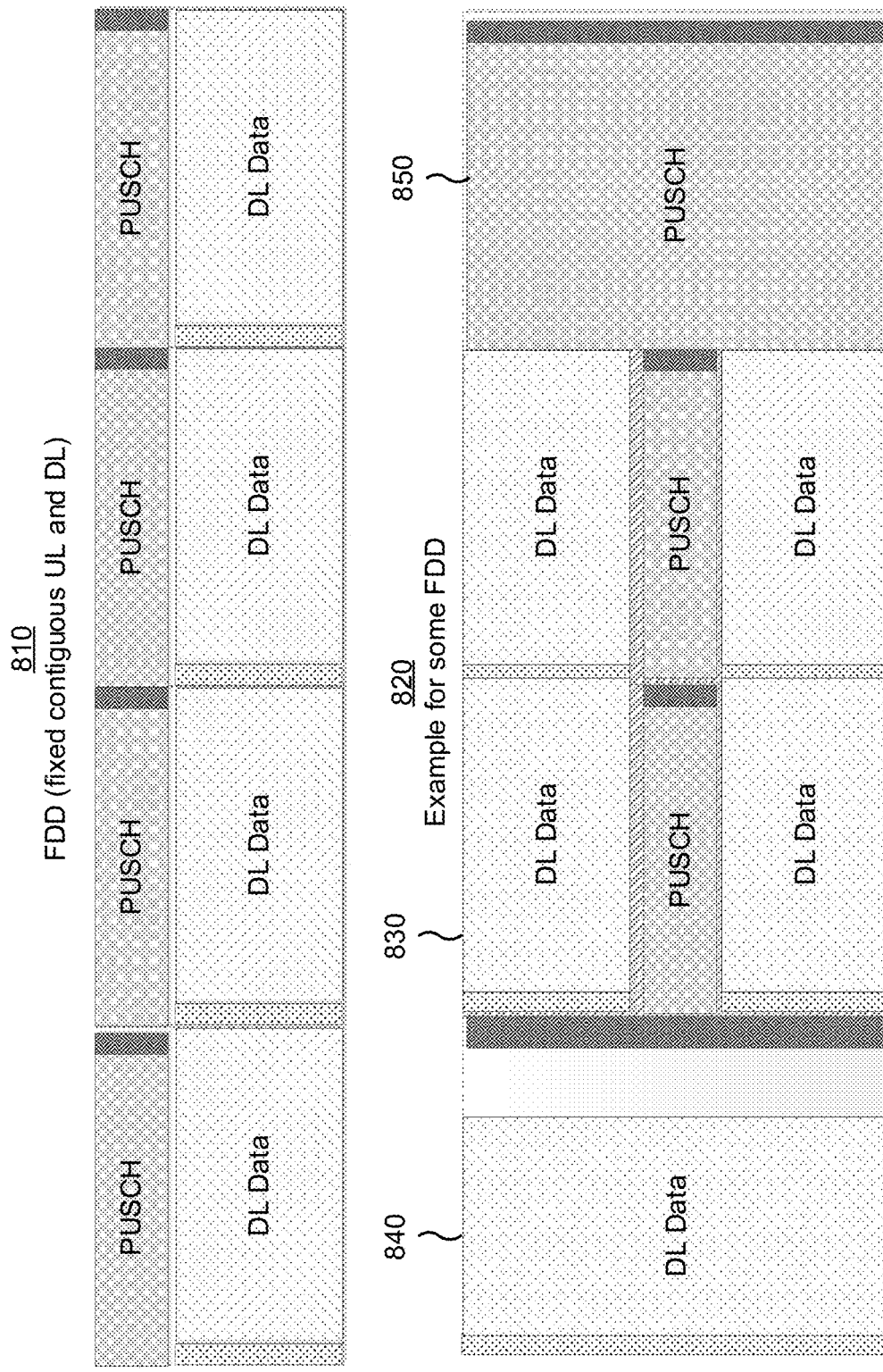

FIG. 8 illustrates examples 810 and 820 of FDD configurations. In example 800, a fixed FDD configuration is used and the uplink frequency region is provided at an edge of the component carrier (e.g., rather than in between downlink frequency regions). In example 820, a mixture of TDD and FDD is used. For example, FDD is used in the time interval shown by reference number 830, wherein TDD is used in the time intervals shown by reference numbers 840 and 850. While FDD partitioning within a single component carrier is shown in FIGS. 6-8 for simplicity, it should be understood that FDD partitioning can also be extended to carrier aggregation on the unpaired spectrum.

Figure 9:
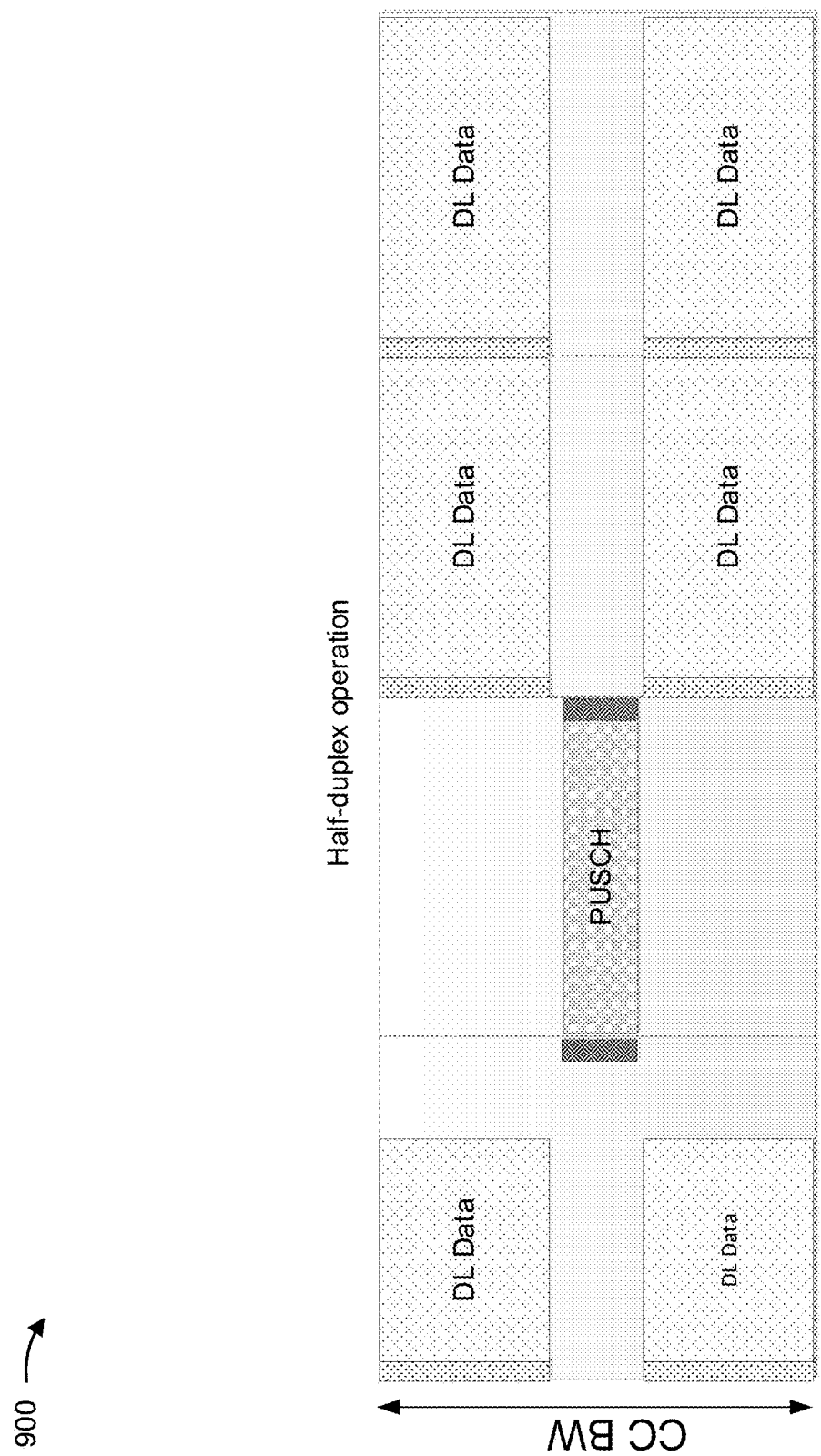

FIG. 9 shows an example 900 of an FDD configuration for a half-duplex BS 110. A half-duplex BS 110 may refer to a BS 110 that is capable of only one of transmitting or receiving at a given time. Some low-cost or low-complexity base stations may use half-duplex communication. As shown, in example 900, the BS 110 may perform only uplink or downlink communication at a given time. In this case, the BS 110 may utilize dynamic scheduling to improve uplink or downlink resource utilization (for example, by increasing the bandwidth of the uplink or downlink frequency region during the uplink or downlink transmission).

Figure 10:
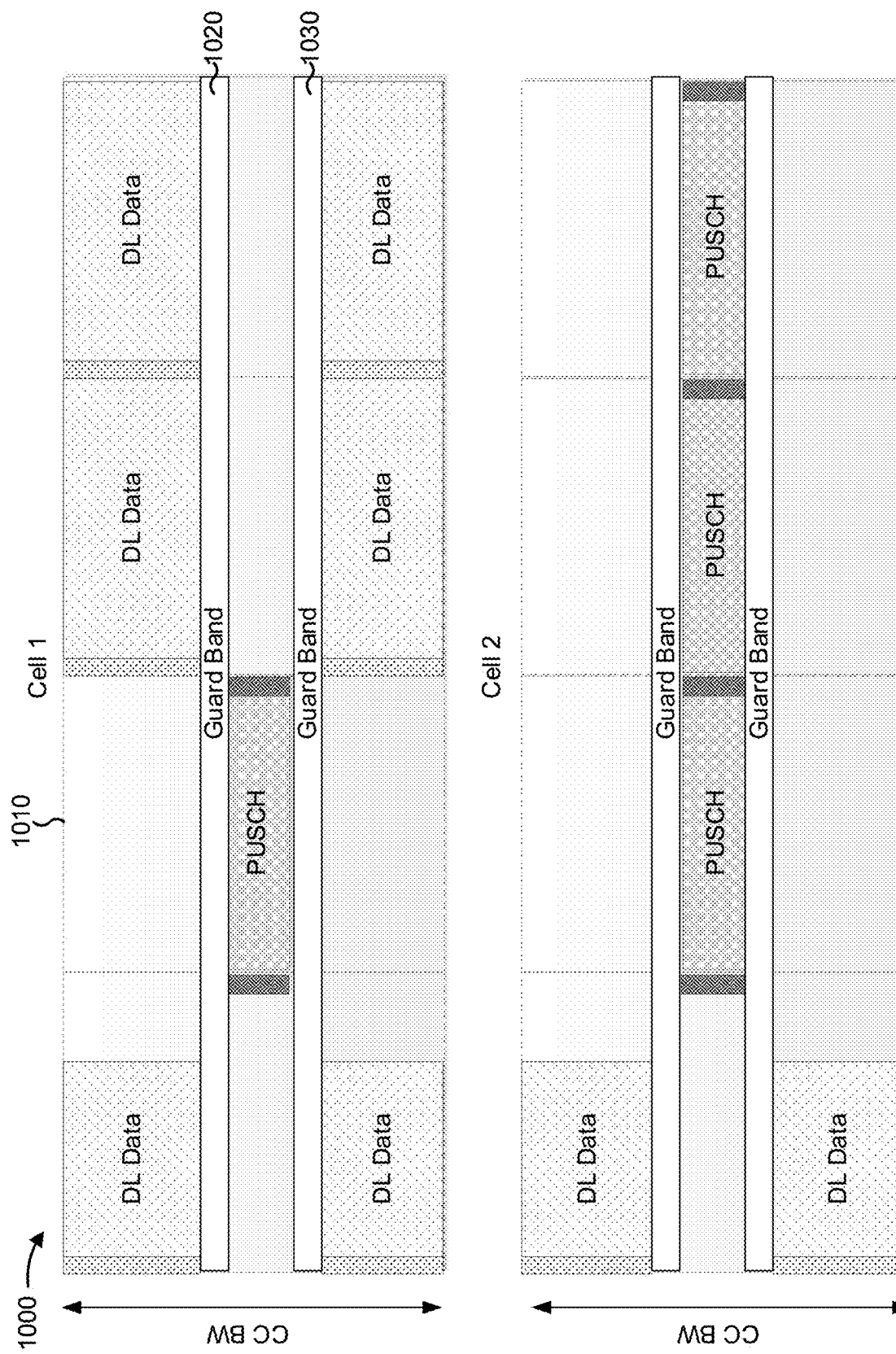

FIG. 10 shows an example 1000 of inter-base-station interference management for FDD on unpaired spectrum. Alignment of uplink and downlink partitions across base stations may reduce impact of downlink aggressors. For illustration, refer to example 1000. Example 1000 shows transmissions and receptions on a single component carrier for two synchronized cells. In example 1000, the downlink of Cell 2 is an aggressor to the uplink of Cell 1. Accordingly, Cell 1 and Cell 2 may be coordinated such that Cell 2 does not transmit on the time interval shown by reference number 1010, which may reduce interference with Cell 1's uplink frequency region. Additionally, or alternatively, a frequency gap (shown by reference numbers 1020 and 1030 as a guard band) may be provided between the uplink frequency regions and the downlink frequency regions by Cell 1 and Cell 2, thereby further reducing interference. In some aspects, the frequency gap may be provided between any uplink frequency region and any downlink frequency region, including those described herein and those associated with other FDD configurations not described herein.

Figure 11:
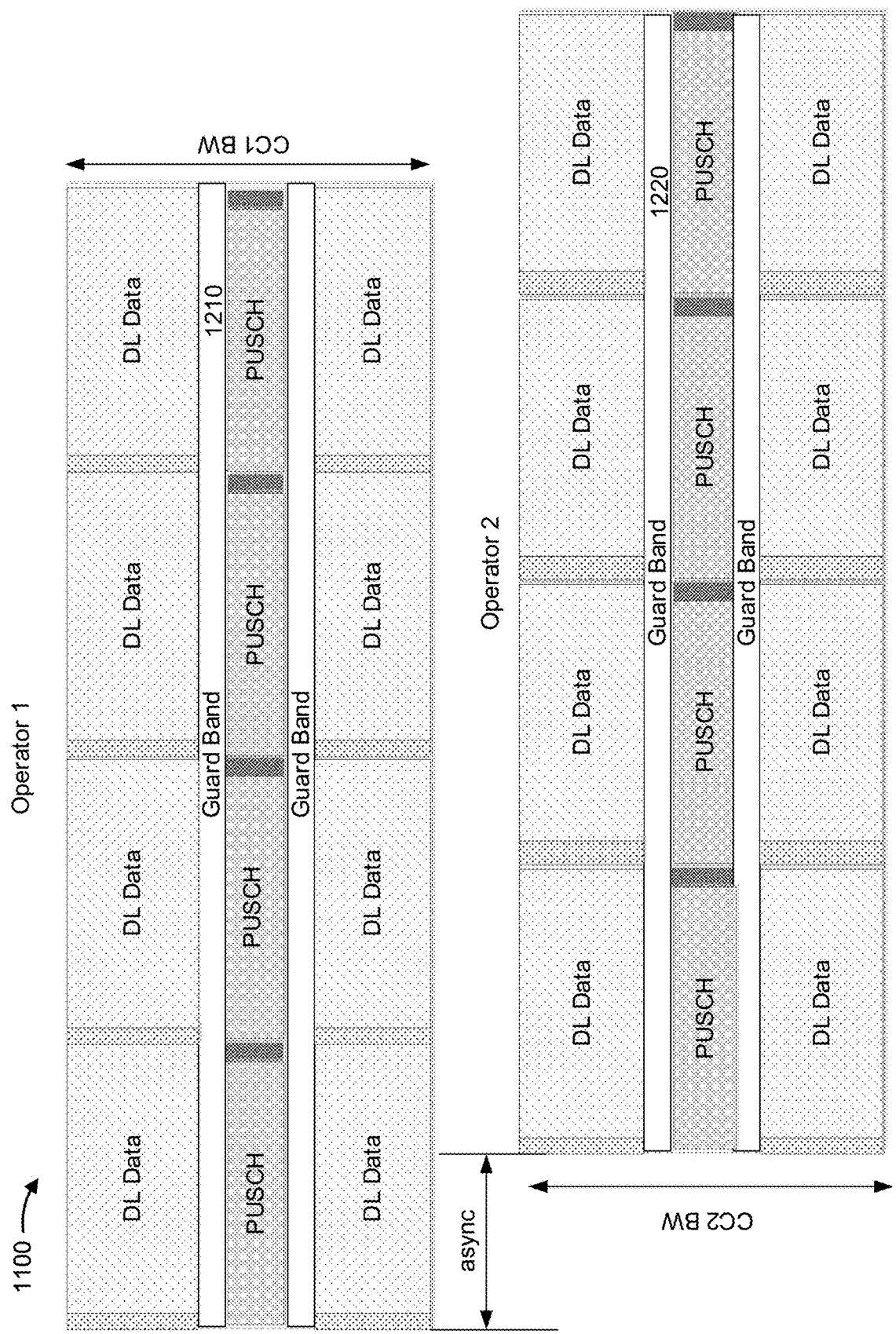

FIG. 11 illustrates an example 1100 of interference management for asynchronous operators. As shown, a first cell, provided by an Operator 1, may be asynchronous with a second cell, provided by Operator 2. As further shown, the first cell and the second cell may be associated with different component carriers (CCs) (CC1 and CC2, respectively). In this case, a frequency gap (shown as guard band) may mitigate intra-cell interference. Furthermore, the provision of uplink frequency regions within the two downlink frequency regions may reduce inter-cell interference. For example, Operator 1's downlink frequency region may be separated from Operator 2's uplink frequency region by Operator 2's downlink frequency region, thereby reducing the impact of interference between Operator 1's downlink frequency region and Operator 2's uplink frequency region. In some aspects, Operator 1 or Operator 2 (or BS 110 or UE 120) may use other interference mitigation or cancellation techniques, such as an adjacent channel leakage ratio (ACLR)-based approach, half-duplex transmission, interference nulling, a cross-link interference (CLI) mitigation technique, a remote interference management (RIM) technique, and/or the like. Additionally, or alternatively, a spatial separation may be provided between antennas of Operator 1 and Operator 2, which may further reduce interference and aid with interference cancellation. For example, a first antenna array or sub-array may be used to provide a cell associated with Operator 1, and a second antenna array or sub-array, spatially separated from the first antenna array or sub-array, may be used to provide a cell associated with Operator 2.

Figure 12:
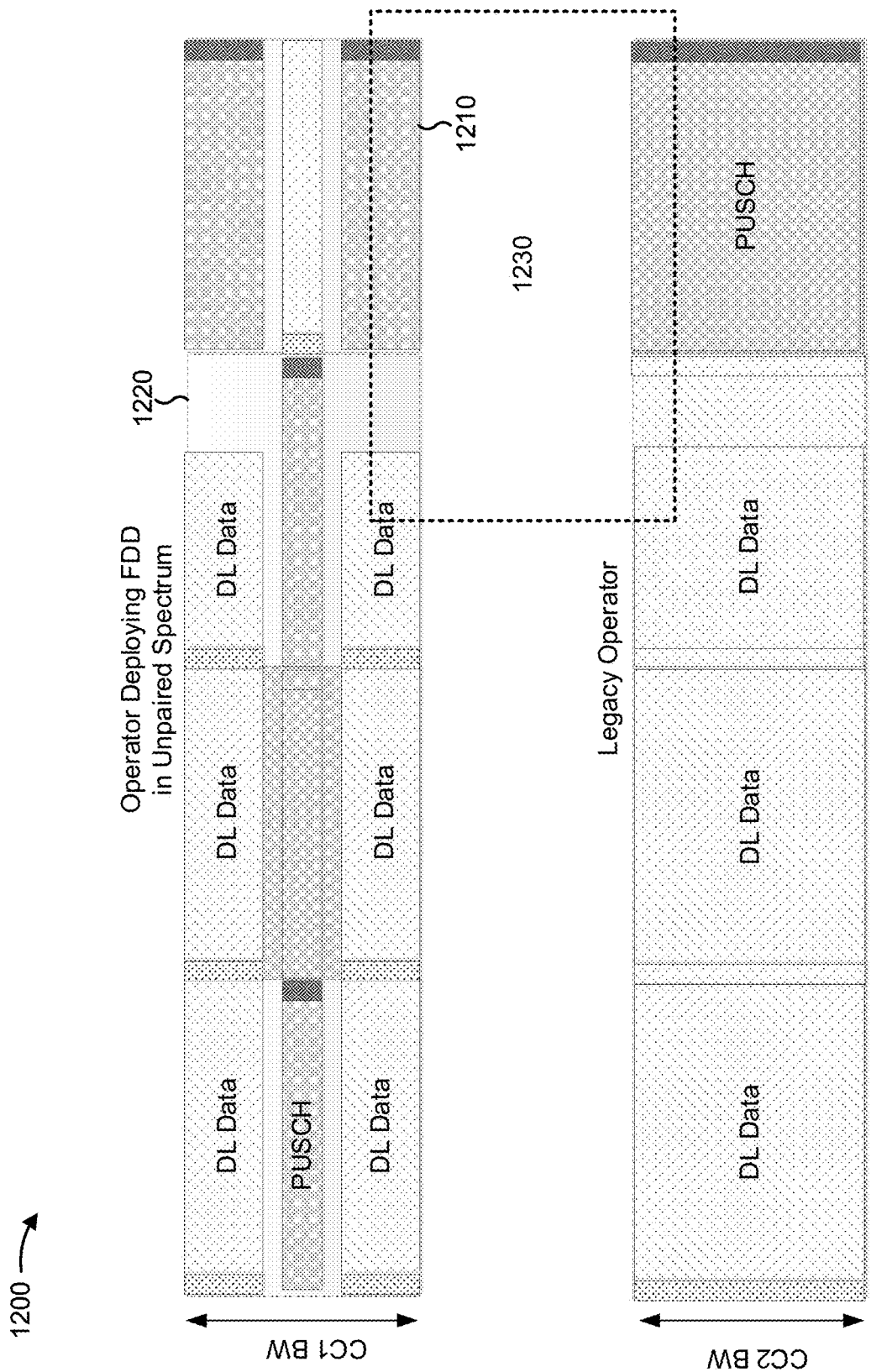

FIG. 12 illustrates an example 1200 of interference management for synchronous operators. As shown, example 1200 includes a first operator deploying an FDD network in unpaired spectrum and a second operator (shown as Legacy Operator) deploying a TDD network in the unpaired spectrum. For example, the second operator may be associated with a guaranteed synchronous operation (such as in deployments in some countries, such as some Chinese deployments), a semi-static operation (as in LTE), and/or the like.

In this case, and as shown by reference number 1210, the operator deploying the FDD network may configure an uplink frequency region to be adjacent to an uplink time interval of the legacy operator, thereby reducing interference between the operator deploying the FDD network and the legacy operator. Furthermore, as shown by reference number 1220, the operator deploying the FDD network may provide a time gap between a downlink frequency region of the operator deploying the FDD network and the uplink time interval of the legacy operator, thereby further reducing inter-operator interference. In some aspects, additional or alternative interference mitigation or cancellation operations may be performed in the time region shown by reference number 1230, such as spatial/jammer nulling, inter-operator aggressor detection, and/or the like.

Figure 13:

FIG. 13 illustrates an example 1300 of variable frequency partitions and fixed frequency partitions for operators on different component carriers. As shown by reference number 1310, a first cell may use variable frequency partitions, in which different frequency partitions can be used in different slots. As shown by reference number 1320, a second cell may use a fixed frequency partition, in which a same frequency partition is used across multiple time intervals. In a case when interference mitigation or cancellation techniques (such as ACLR-based approaches, guard bands, and spatial separation of antennas) are sufficient to provide adequate interference control (e.g., to achieve a target interference ratio and/or the like), then each operator may independently choose frequency partitions. When interference mitigation or cancellation techniques are not sufficient to provide adequate interference control, then operators may coordinate with each other using the techniques described elsewhere herein.

It should be noted that the approach described in connection with FIG. 13 can be implemented without modifying a wireless communication standard for 5G/NR communication. For example, each operator's BS or cell may provide scheduling information that conforms with the respective FDD configurations shown, thereby providing the FDD configuration without modification of a SIB or other message to signal information identifying the FDD configuration.

Figure 14:
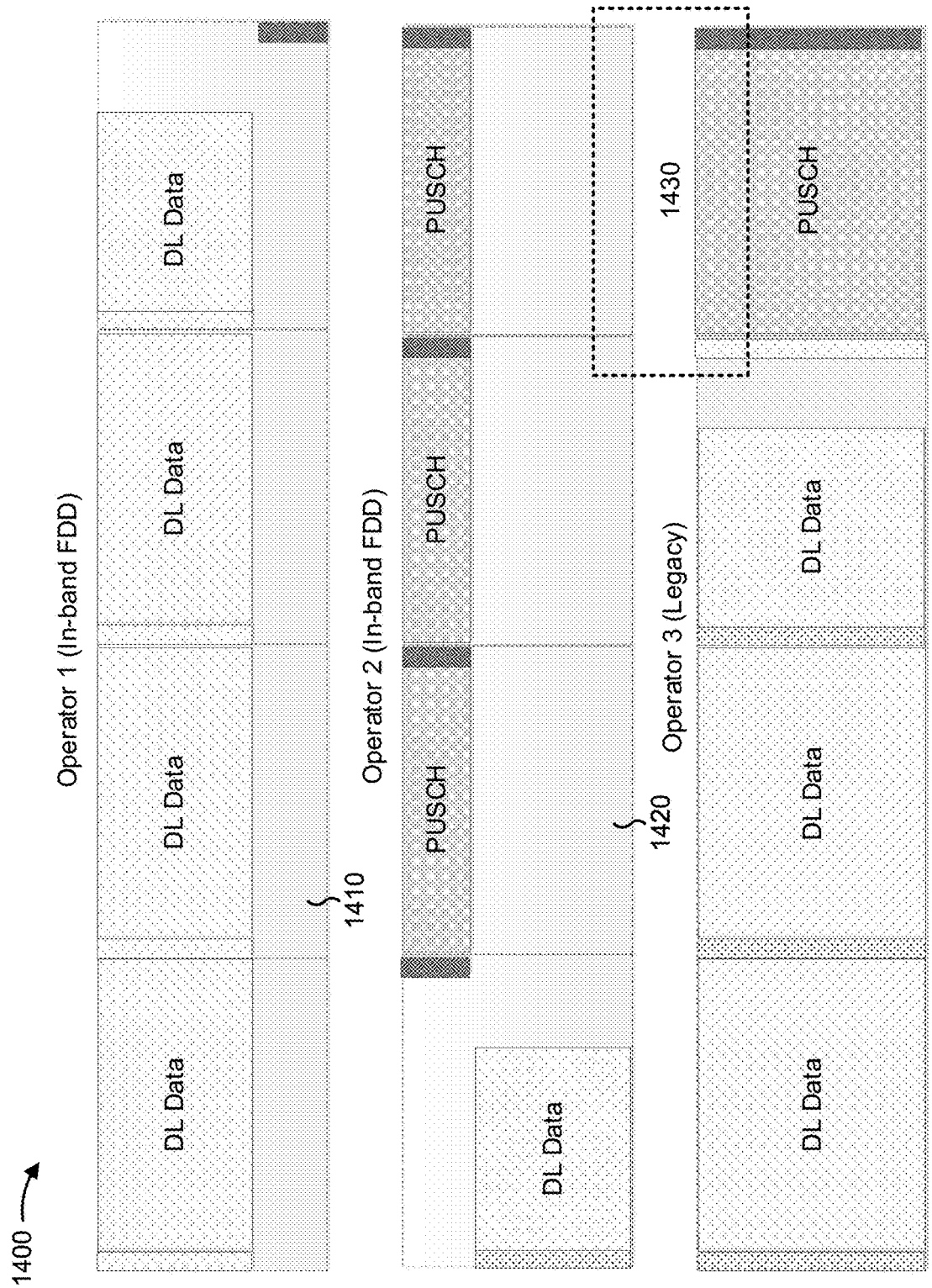

FIG. 14 shows an example 1400 of a set of FDD configurations and TDD configurations for an Operator 1 (performing in-band FDD), an Operator 2 (performing in-band FDD), and an Operator 3 (performing TDD, referred to as a legacy operator). Each operator is associated with a respective component carrier. As shown by reference number 1410, Operator 1 may provide a frequency gap between a downlink frequency region of Operator 1 and an uplink frequency region of Operator 2, which may reduce interference between Operator 1 and Operator 2. Furthermore, as shown by reference number 1420, Operator 2 may provide a frequency gap between the uplink frequency region of Operator 2 and downlink transmissions of Operator 3, which may reduce interference between Operator 2 and Operator 3. In some aspects, Operator 2 may use one or more restrictions during the time interval shown by reference number 1430 to reduce interference between a downlink transmission of Operator 2 (not shown) and an uplink transmission of Operator 3.

The FDD configurations shown in FIG. 14 (and in the other Figures) may be implemented based at least in part on modifying a specification. For example, the FDD configurations shown in FIG. 14 may be communicated using system information, such as a SIB, whose format is specified in a wireless communication standard. In some aspects, an FDD configuration may be slot-dependent. Additionally, or alternatively, a particular slot format indication may be associated with an FDD configuration that is communicated to a UE 120.

Figure 15:
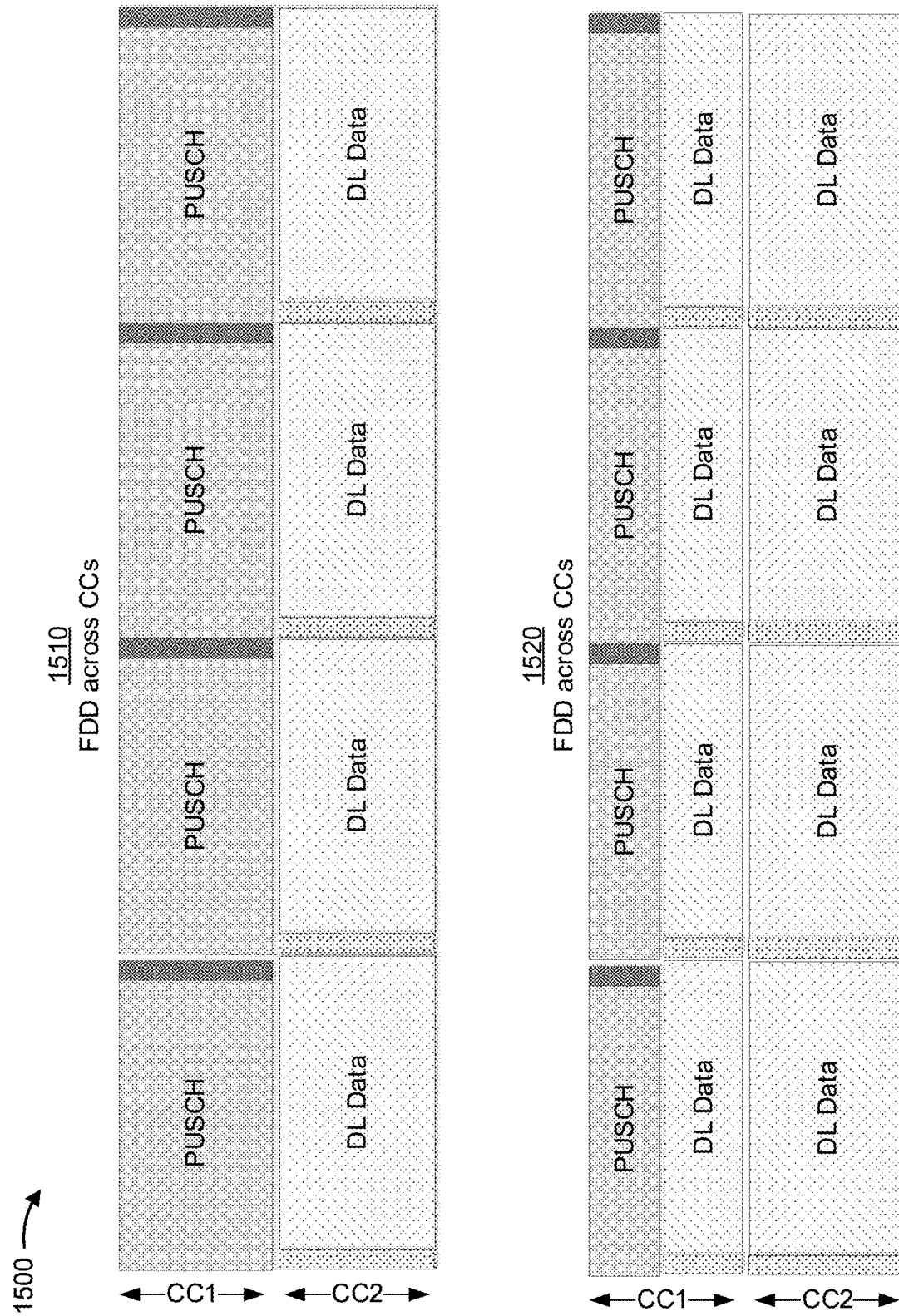

FIG. 15 shows an example 1500 of an FDD configuration in unpaired spectrum using multiple component carriers (CCs). As shown by reference number 1510, in some aspects, a first CC may provide an uplink frequency region and a second component carrier may provide a downlink frequency region. As shown by reference number 1520, in some aspects, a first CC may provide an uplink frequency region and a downlink frequency region, and a second CC may provide a downlink frequency region. Of course, other multi-CC examples may differ from the specific FDD configuration shown in FIG. 15.

Figure 16:
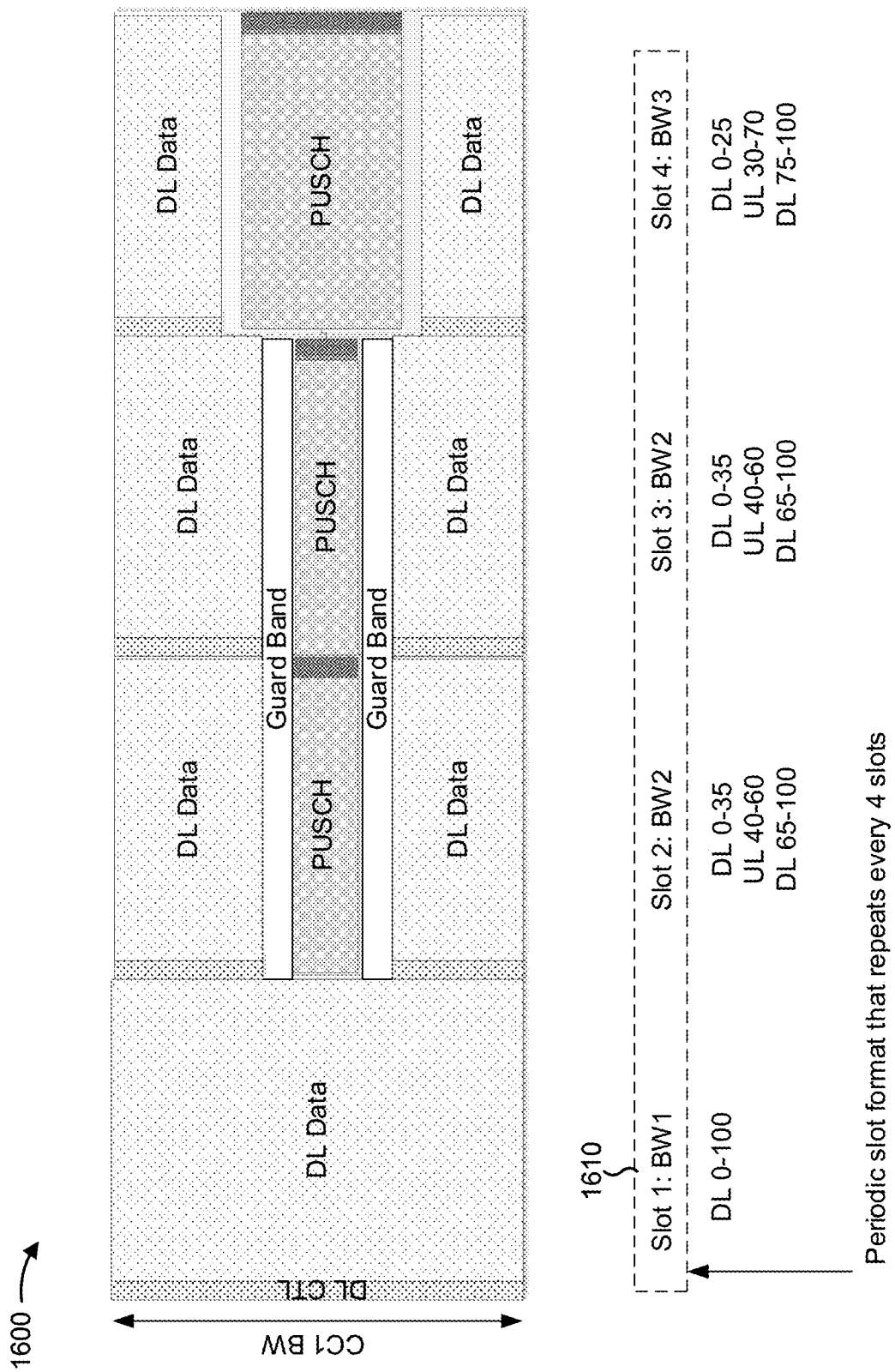

FIG. 16 shows an example 1600 of a periodic slot format indicator being used to provide an FDD configuration. A periodic slot format indicator may allow a BS to signal, to a UE, a slot format for a set of slots that repeats over time. For example, for a TDD configuration, the periodic slot format indicator may indicate down-down-special-up, and this pattern of slots may repeat every four slots. This is referred to as a semi-static slot format indication. Semi-static slot format indications may provide transparency to regulators, and may be used to reduce spurious transmissions when control information is mis-decoded.

In some aspects, the slot format indication may be used to indicate an FDD configuration. For example, as shown by reference number 1610, each slot may be associated with an FDD configuration (shown as BW1, BW2, and BW3). The FDD configuration may indicate at least one downlink frequency region and/or at least one uplink frequency region for each slot. For example, BW1 is associated with a downlink frequency region across an entire bandwidth of the component carrier (shown as DL 0-100) whereas BW2 is associated with a first downlink frequency region across a first 35 percent of the bandwidth of the component carrier, an uplink frequency region across a center 20 percent of the bandwidth of the component carrier, and a second downlink frequency region across a second 35 percent of the bandwidth of the component carrier. It can be seen that frequency gaps are also configured by the slot format indication, for example, in BW1 as gaps between the first 35 percent, the center 20 percent, and the second 35 percent.

As indicated above, FIGS. 6-16 are provided as examples. Other examples may differ from what is described with respect to FIGS. 6-16.

Figure 17:
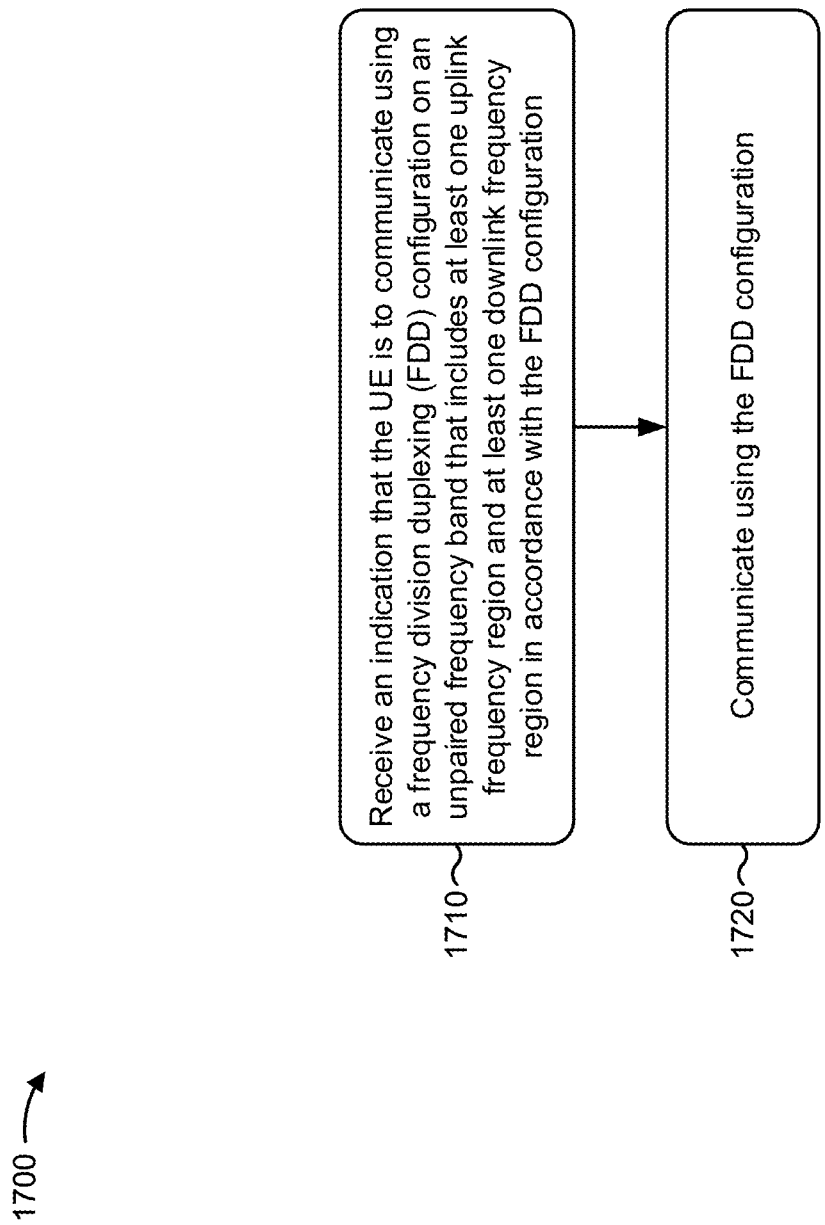
FIG. 17 is a diagram illustrating an example process performed, for example, by a user equipment, in accordance with various aspects of the present disclosure.

FIG. 17 is a diagram illustrating an example process 1700 performed, for example, by a user equipment, in accordance with various aspects of the present disclosure. Example process 1700 is an example where a UE (e.g., user equipment 120 and/or the like) performs operations associated with frequency division duplexing in the unpaired spectrum.

As shown in FIG. 17, in some aspects, process 1700 may include receiving an indication that the UE is to communicate using an FDD configuration on an unpaired frequency band that includes at least one uplink frequency region and at least one downlink frequency region in accordance with the FDD configuration (block 1710). For example, the UE (e.g., using antenna 252, DEMOD 254, MIMO detector 256, receive processor 258, controller/processor 280, and/or the like) may receive an indication that the UE is to communicate using an FDD configuration on an unpaired frequency band that includes at least one uplink frequency region and at least one downlink frequency region in accordance with the FDD configuration, as described above.

As further shown in FIG. 17, in some aspects, process 1700 may include communicating using the FDD configuration (block 1720). For example, the UE (e.g., using controller/processor 280, transmit processor 264, TX MIMO processor 266, MOD 254, antenna 252, DEMOD 254, MIMO detector 256, receive processor 258, and/or the like) may communicate using the FDD configuration, as described above.

Process 1700 may include additional aspects, such as any single aspect or any combination of aspects described below and/or in connection with one or more other processes described elsewhere herein.

In a first aspect, the FDD configuration is for communication on a single component carrier.

In a second aspect, alone or in combination with the first aspect, the FDD configuration is fixed across multiple time intervals.

In a third aspect, alone or in combination with one or more of the first and second aspects, the at least one downlink frequency region includes two downlink frequency regions and is non-contiguous, wherein the at least one uplink frequency region is contiguous and located within the two downlink frequency regions.

In a fourth aspect, alone or in combination with one or more of the first through third aspects, the at least one uplink frequency region and the at least one downlink frequency region are different in a first time interval than in a second time interval.

In a fifth aspect, alone or in combination with one or more of the first through fourth aspects, the FDD configuration is used in one or more first time intervals and a TDD configuration is used in one or more second time intervals.

In a sixth aspect, alone or in combination with one or more of the first through fifth aspects, the at least one uplink frequency region is associated with a different bandwidth than the at least one downlink frequency region.

In a seventh aspect, alone or in combination with one or more of the first through sixth aspects, communicating using the FDD configuration further comprises communicating in a full duplex mode, wherein the UE transmits on the at least one uplink frequency region while contemporaneously receiving on the at least one downlink frequency region according to the FDD configuration.

In an eighth aspect, alone or in combination with one or more of the first through seventh aspects, communicating using the FDD configuration further comprises communicating in half duplex using the FDD configuration, wherein the UE is capable of either receiving on the at least one downlink frequency region or transmitting on the at least one uplink frequency region at a given time.

In a ninth aspect, alone or in combination with one or more of the first through eighth aspects, the UE may perform cross-link interference management in connection with communicating using the FDD configuration.

In a tenth aspect, alone or in combination with one or more of the first through ninth aspects, the UE may receive an indication that a base station is capable of transmitting in the at least one uplink frequency region while receiving in the at least one downlink frequency region contemporaneously.

In an eleventh aspect, alone or in combination with one or more of the first through tenth aspects, the UE may receive an indication that a base station is not capable of transmitting in the at least one uplink frequency region while receiving in the at least one downlink frequency region contemporaneously.

In a twelfth aspect, alone or in combination with one or more of the first through eleventh aspects, a frequency gap is provided between an uplink frequency region of the at least one uplink frequency region and a downlink frequency region of the at least one downlink frequency region.

In a thirteenth aspect, alone or in combination with one or more of the first through twelfth aspects, the FDD configuration is used for communication between the UE and a serving base station, and for communication between the UE and a neighboring base station.

In a fourteenth aspect, alone or in combination with one or more of the first through thirteenth aspects, respective partitions of the at least one uplink frequency region and the at least one downlink frequency region are configured in accordance with the indication, and the UE may receive dynamic scheduling information that schedules an uplink or downlink communication in accordance with the FDD configuration.

In a fifteenth aspect, alone or in combination with one or more of the first through fourteenth aspects, the indication indicates the FDD configuration.

In a sixteenth aspect, alone or in combination with one or more of the first through fifteenth aspects, the FDD configuration is associated with a slot format indication communicated to the UE.

In a seventeenth aspect, alone or in combination with one or more of the first through sixteenth aspects, communicating using the FDD configuration is based at least in part on receiving scheduling information that schedules an uplink or downlink communication in accordance with the FDD configuration.

In an eighteenth aspect, alone or in combination with one or more of the first through seventeenth aspects, the FDD configuration is specified in a wireless communication standard.

In a nineteenth aspect, alone or in combination with one or more of the first through eighteenth aspects, the FDD configuration is indicated to the UE through broadcast system information.

In a twentieth aspect, alone or in combination with one or more of the first through nineteenth aspects, the at least one uplink frequency region and the at least one downlink frequency region associated with the FDD configuration are slot-dependent.

Although FIG. 17 shows example blocks of process 1700, in some aspects, process 1700 may include additional blocks, fewer blocks, different blocks, or differently arranged blocks than those depicted in FIG. 17. Additionally, or alternatively, two or more of the blocks of process 1700 may be performed in parallel.

Figure 18:
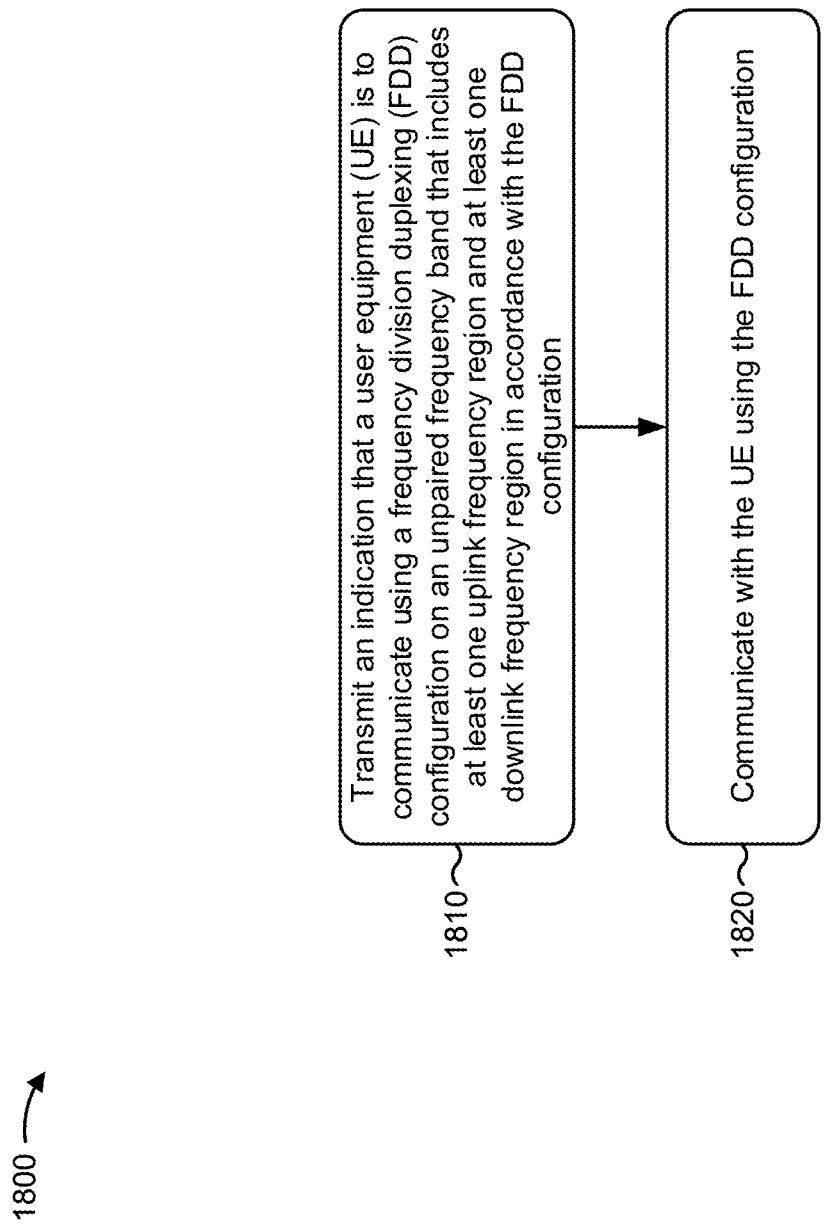
FIG. 18 is a diagram illustrating an example process performed, for example, by a base station, in accordance with various aspects of the present disclosure.

FIG. 18 is a diagram illustrating an example process 1800 performed, for example, by a base station, in accordance with various aspects of the present disclosure. Example process 1800 is an example where a base station (e.g., base station 110 and/or the like) performs operations associated with frequency division duplexing in unpaired spectrum.

As shown in FIG. 18, in some aspects, process 1800 may include transmitting an indication that a UE is to communicate using an FDD configuration on an unpaired frequency band that includes at least one uplink frequency region and at least one downlink frequency region in accordance with the FDD configuration (block 1810). For example, the base station (e.g., using transmit processor 220, receive processor 238, controller/processor 240, memory 242, and/or the like) may transmit an indication that a UE is to communicate using an FDD configuration on an unpaired frequency band that includes at least one uplink frequency region and at least one downlink frequency region in accordance with the FDD configuration, as described above.

As further shown in FIG. 18, in some aspects, process 1800 may include communicating with the UE using the FDD configuration (block 1820). For example, the base station (e.g., using transmit processor 220, receive processor 238, controller/processor 240, memory 242, and/or the like) may communicate with the UE using the FDD configuration, as described above.

Process 1800 may include additional aspects, such as any single aspect or any combination of aspects described below and/or in connection with one or more other processes described elsewhere herein.

In a first aspect, the FDD configuration is for communication on a single component carrier.

In a second aspect, alone or in combination with the first aspect, the FDD configuration is fixed across multiple time intervals.

In a third aspect, alone or in combination with one or more of the first and second aspects, the at least one downlink frequency region includes two downlink frequency regions and is non-contiguous, wherein the at least one uplink frequency region is contiguous and located within the two downlink frequency regions.

In a fourth aspect, alone or in combination with one or more of the first through third aspects, the at least one uplink frequency region and the at least one downlink frequency region are different in a first time interval than in a second time interval.

In a fifth aspect, alone or in combination with one or more of the first through fourth aspects, the FDD configuration is used in one or more first time intervals and a TDD configuration is used in one or more second time intervals.

In a sixth aspect, alone or in combination with one or more of the first through fifth aspects, the at least one uplink frequency region is associated with a different bandwidth than the at least one downlink frequency region.

In a seventh aspect, alone or in combination with one or more of the first through sixth aspects, communicating using the FDD configuration further comprises communicating in a full duplex mode, wherein the base station receives on the at least one uplink frequency region while contemporaneously transmitting on the at least one downlink frequency region according to the FDD configuration.

In an eighth aspect, alone or in combination with one or more of the first through seventh aspects, communicating using the FDD configuration further comprises communicating in a half duplex mode using the FDD configuration, wherein the base station is capable of either receiving on the at least one uplink frequency region or transmitting on the at least one downlink frequency region at a given time.

In a ninth aspect, alone or in combination with one or more of the first through eighth aspects, the base station provides a first cell and a second cell, wherein respective downlink communications or respective uplink communications of the first cell and the second cell are transmitted using a first set of antennas for the first cell and a second set of antennas for the second cell, wherein the first set of antennas and the second set of antennas are spatially separated from each other.

In a tenth aspect, alone or in combination with one or more of the first through ninth aspects, the first cell is associated with a first operator and the second cell is associated with a second operator.

In an eleventh aspect, alone or in combination with one or more of the first through tenth aspects, the at least one uplink frequency region and the at least one downlink frequency region at least partially overlap each other in time.

In a twelfth aspect, alone or in combination with one or more of the first through eleventh aspects, the at least one uplink frequency region and the at least one downlink frequency region do not overlap each other in time.

In a thirteenth aspect, alone or in combination with one or more of the first through twelfth aspects, a frequency gap is provided between an uplink frequency region of the at least one uplink frequency region and a downlink frequency region of the at least one downlink frequency region.

In a fourteenth aspect, alone or in combination with one or more of the first through thirteenth aspects, the base station is a first base station, wherein the at least one downlink frequency region is configured not to overlap with an uplink frequency region of a second base station.

In a fifteenth aspect, alone or in combination with one or more of the first through fourteenth aspects, the uplink frequency region of the second base station is on a same carrier as the at least one uplink frequency region of the first base station.

In a sixteenth aspect, alone or in combination with one or more of the first through fifteenth aspects, a guard band is provided between the at least one downlink frequency region and the uplink frequency region of the second base station.

In a seventeenth aspect, alone or in combination with one or more of the first through sixteenth aspects, the base station is a first base station, wherein the at least one downlink frequency region is configured not to be adjacent with an uplink frequency region of a second base station.

In an eighteenth aspect, alone or in combination with one or more of the first through seventeenth aspects, the first base station and the second base station are asynchronous with each other.

In a nineteenth aspect, alone or in combination with one or more of the first through eighteenth aspects, the base station is a first base station, wherein the method further comprises performing inter-base-station interference management with a second base station based at least in part on respective FDD configurations of the first base station and the second base station.

In a twentieth aspect, alone or in combination with one or more of the first through nineteenth aspects, the indication identifies respective partitions of the at least one uplink frequency region and the at least one downlink frequency region, and wherein the base station is to transmit dynamic scheduling information that schedules an uplink or downlink communication in accordance with the FDD configuration.

In a twenty first aspect, alone or in combination with one or more of the first through twentieth aspects, the indication indicates the FDD configuration.

In a twenty second aspect, alone or in combination with one or more of the first through twenty first aspects, the FDD configuration is associated with a slot format indication communicated to the UE.

In a twenty third aspect, alone or in combination with one or more of the first through twenty second aspects, the base station may transmit scheduling information that schedules an uplink or downlink communication in accordance with the FDD configuration.

In a twenty fourth aspect, alone or in combination with one or more of the first through twenty third aspects, the FDD configuration is specified in a wireless communication standard.

In a twenty fifth aspect, alone or in combination with one or more of the first through twenty fourth aspects, the indication comprises a system information block (SIB).

In a twenty sixth aspect, alone or in combination with one or more of the first through twenty fifth aspects, the base station is a first base station. In some aspects, the FDD configuration is based at least in part on a time division duplexing (TDD) configuration of a second base station.

In a twenty seventh aspect, alone or in combination with one or more of the first through twenty sixth aspects, the at least one downlink frequency region is not provided adjacent in frequency to an uplink slot of the second base station.

Although FIG. 18 shows example blocks of process 1800, in some aspects, process 1800 may include additional blocks, fewer blocks, different blocks, or differently arranged blocks than those depicted in FIG. 18. Additionally, or alternatively, two or more of the blocks of process 1800 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
   receiving an indication that the UE is to communicate using a frequency division duplexing (FDD) configuration on an unpaired frequency band that includes at least one uplink frequency region and at least one downlink frequency region for communication on a single component carrier in accordance with the FDD configuration,
      wherein the at least one downlink frequency region includes two downlink frequency regions and is non-contiguous within the single component carrier, and wherein the at least one uplink frequency region is contiguous and located within the two downlink frequency regions, and
      wherein the FDD configuration is for communication on the single component carrier; and
   communicating using the FDD configuration.

2. The method of claim 1, wherein the FDD configuration is fixed across multiple time intervals.

3. The method of claim 1, wherein the at least one uplink frequency region and the at least one downlink frequency region are different in a first time interval than in a second time interval.

4. The method of claim 1, wherein the FDD configuration is used in one or more first time intervals and a time division duplexing (TDD) configuration is used in one or more second time intervals.

5. The method of claim 1, wherein the at least one uplink frequency region is associated with a different bandwidth than the at least one downlink frequency region.

6. The method of claim 1, wherein communicating using the FDD configuration further comprises:
   communicating in a full duplex mode, wherein the UE transmits on the at least one uplink frequency region while contemporaneously receiving on the at least one downlink frequency region according to the FDD configuration.

7. The method of claim 1, wherein communicating using the FDD configuration further comprises:
   communicating in a half duplex mode using the FDD configuration, where the UE is capable of either receiving on the at least one downlink frequency region or transmitting on the at least one uplink frequency region at a given time.

8. The method of claim 1, further comprising:
   performing cross-link interference management in connection with communicating using the FDD configuration.

9. The method of claim 1, wherein a frequency gap is provided between an uplink frequency region of the at least one uplink frequency region and the two downlink frequency regions.

10. The method of claim 1, wherein the FDD configuration is used for communication between the UE and a serving base station, and for communication between the UE and a neighboring base station.

11. The method of claim 1, wherein respective partitions of the at least one uplink frequency region and the at least one downlink frequency region are configured in accordance with the indication, and wherein the method further comprises:
    receiving dynamic scheduling information that schedules an uplink or downlink communication in accordance with the FDD configuration.

12. The method of claim 1, wherein the indication indicates the FDD configuration.

13. The method of claim 1, wherein the FDD configuration is associated with a slot format indication communicated to the UE.

14. The method of claim 1, wherein the FDD configuration is indicated to the UE through broadcast system information.

15. The method of claim 1, wherein the at least one uplink frequency region and the at least one downlink frequency region associated with the FDD configuration are slot-dependent.

16. A method of wireless communication performed by a base station, comprising:
    transmitting an indication that a user equipment (UE) is to communicate using a frequency division duplexing (FDD) configuration on an unpaired frequency band that includes at least one uplink frequency region and at least one downlink frequency region for communication on a single component carrier in accordance with the FDD configuration,
       wherein the at least one downlink frequency region includes two downlink frequency regions and is non-contiguous within the single component carrier, and wherein the at least one uplink frequency region is contiguous and located within the two downlink frequency regions, and
       wherein the FDD configuration is for communication on the single component carrier; and
    communicating with the UE using the FDD configuration.

17. The method of claim 16, wherein communicating using the FDD configuration further comprises:
    communicating in a full duplex mode, wherein the base station receives on the at least one uplink frequency region while contemporaneously transmitting on the at least one downlink frequency region according to the FDD configuration.

18. The method of claim 16, wherein communicating using the FDD configuration further comprises:
    communicating in a half duplex mode using the FDD configuration, where the base station is capable of either receiving on the at least one uplink frequency region or transmitting on the at least one downlink frequency region at a given time.

19. The method of claim 16, wherein the at least one uplink frequency region and the at least one downlink frequency region at least partially overlap each other in time.

20. The method of claim 16, wherein the at least one uplink frequency region and the at least one downlink frequency region do not overlap each other in time.

21. The method of claim 16, wherein a frequency gap is provided between an uplink frequency region of the at least one uplink frequency region and a downlink frequency region of the at least one downlink frequency region.

22. The method of claim 16, wherein the base station is a first base station, and wherein the at least one downlink frequency region is configured not to overlap with an uplink frequency region of a second base station.

23. The method of claim 22, wherein the uplink frequency region of the second base station is on a same carrier as the at least one uplink frequency region of the first base station.

24. The method of claim 22, wherein the first base station and the second base station are synchronous with each other and are configured for communication on the single component carrier.

25. The method of claim 16, wherein the base station is a first base station, and wherein the at least one downlink frequency region is configured not to be adjacent with an uplink frequency region of a second base station.

26. The method of claim 25, wherein the first base station and the second base station are asynchronous with each other.

27. The method of claim 16, wherein the base station is a first base station, and wherein the method further comprises:
performing inter-base-station interference management with a second base station based at least in part on respective FDD configurations of the first base station and the second base station.

28. The method of claim 16, wherein an uplink bandwidth of the at least one uplink frequency region is different from a downlink bandwidth of the at least one downlink frequency region.

29. A user equipment (UE) for wireless communication, comprising:
a memory; and
one or more processors operatively coupled to the memory, the memory and the one or more processors configured to:
receive an indication that the UE is to communicate using a frequency division duplexing (FDD) configuration on an unpaired frequency band that includes at least one uplink frequency region and at least one downlink frequency region for communication on a single component carrier in accordance with the FDD configuration,
wherein the at least one downlink frequency region includes two downlink frequency regions and is non-contiguous within the single component carrier, and wherein the at least one uplink frequency region is contiguous and located within the two downlink frequency regions, and
wherein the FDD configuration is for communication on the single component carrier; and
communicate using the FDD configuration.

30. A base station for wireless communication, comprising:
a memory; and
one or more processors operatively coupled to the memory, the memory and the one or more processors configured to:
transmit an indication that a user equipment (UE) is to communicate using a frequency division duplexing (FDD) configuration on an unpaired frequency band that includes at least one uplink frequency region and at least one downlink frequency region for communication on a single component carrier in accordance with the FDD configuration,
wherein the at least one downlink frequency region includes two downlink frequency regions and is non-contiguous within the single component carrier, and wherein the at least one uplink frequency region is contiguous and located within the two downlink frequency regions, and
wherein the FDD configuration is for communication on the single component carrier; and
communicate with the UE using the FDD configuration.

* * * * *